US012383959B2

(12) United States Patent
Dardis et al.

(10) Patent No.: US 12,383,959 B2
(45) Date of Patent: Aug. 12, 2025

(54) ON-AXIS MELT POOL SENSORS IN AN ADDITIVE MANUFACTURING APPARATUS

(71) Applicant: RENISHAW PLC, Wotton-under-Edge (GB)

(72) Inventors: John Dardis, Stroud (GB); Ceri Brown, Plaisance-du-Touch (FR); Jonathan Mansell, Bristol (GB)

(73) Assignee: RENISHAW PLC, Wotton-Under-Edge (GB)

( * ) Notice: Subject to any disclaimer, the term of this patent is extended or adjusted under 35 U.S.C. 154(b) by 981 days.

(21) Appl. No.: 17/434,311

(22) PCT Filed: Feb. 26, 2020

(86) PCT No.: PCT/GB2020/050461
§ 371 (c)(1),
(2) Date: Aug. 26, 2021

(87) PCT Pub. No.: WO2020/174240
PCT Pub. Date: Sep. 3, 2020

(65) Prior Publication Data
US 2022/0168813 A1 Jun. 2, 2022

(30) Foreign Application Priority Data
Feb. 28, 2019 (EP) .................................... 19305235

(51) Int. Cl.
*B22F 10/85* (2021.01)
*B22F 10/28* (2021.01)
(Continued)

(52) U.S. Cl.
CPC .............. *B22F 10/85* (2021.01); *B22F 10/28* (2021.01); *B22F 10/366* (2021.01); *B22F 12/44* (2021.01);
(Continued)

(58) Field of Classification Search
CPC ........ B22F 10/85; B22F 10/28; B22F 10/366; B22F 12/44; B22F 12/45; B22F 12/47;
(Continued)

(56) References Cited

U.S. PATENT DOCUMENTS

| 5,430,666 A | 7/1995 | DeAngelis et al. |
| 10,265,912 B2 | 4/2019 | Herzog et al. |

(Continued)

FOREIGN PATENT DOCUMENTS

| CN | 108463300 A | 8/2018 |
| CN | 109070221 A | 12/2018 |

(Continued)

OTHER PUBLICATIONS

Aug. 21, 2019 Extended Search Report issued in European Patent Application No. 19305235.4.
(Continued)

*Primary Examiner* — Robert G Bachner
(74) *Attorney, Agent, or Firm* — Oliff PLC

(57) ABSTRACT

A method of aligning an on-axis melt pool sensor in an additive manufacturing apparatus. The method includes scanning a first laser beam along a first scan path across a working surface using a first optical train to generate a melt pool along the first scan path and scanning a field of view of an on-axis sensor along a second scan path across the working surface using a second optical train for steering a second laser beam. The first and second scan paths intersect. An adjustment to be made to an alignment of the field of view of the on-axis sensor with an optical axis of the second optical train is determined from a variation in the signal generated by the on-axis sensor as the field of view is scanned along the second scan path.

26 Claims, 13 Drawing Sheets

(51) Int. Cl.
  *B22F 10/366* (2021.01)
  *B22F 12/44* (2021.01)
  *B22F 12/45* (2021.01)
  *B22F 12/47* (2021.01)
  *B22F 12/49* (2021.01)
  *B22F 12/90* (2021.01)
  *B33Y 10/00* (2015.01)
  *B33Y 30/00* (2015.01)
  *B33Y 50/02* (2015.01)

(52) U.S. Cl.
  CPC .............. *B22F 12/45* (2021.01); *B22F 12/47* (2021.01); *B22F 12/49* (2021.01); *B22F 12/90* (2021.01); *B33Y 10/00* (2014.12); *B33Y 30/00* (2014.12); *B33Y 50/02* (2014.12)

(58) Field of Classification Search
  CPC .......... B22F 12/49; B22F 12/90; B33Y 10/00; B33Y 30/00; B33Y 50/02; B33Y 40/00; Y02P 10/25; B23K 26/032; B23K 26/342; B29C 64/153; B29C 64/268; B29C 64/393
  See application file for complete search history.

(56) References Cited

U.S. PATENT DOCUMENTS

| | | | |
|---|---|---|---|
| 10,933,468 | B2 | 3/2021 | Jones et al. |
| 11,167,497 | B2 | 11/2021 | Brown et al. |
| 11,358,224 | B2 | 6/2022 | Brown |
| 11,731,365 | B2 | 8/2023 | Brown |
| 2009/0206065 | A1 | 8/2009 | Kruth et al. |
| 2011/0223349 | A1 | 9/2011 | Scott |
| 2013/0168902 | A1 | 7/2013 | Herzog et al. |
| 2014/0348969 | A1 | 11/2014 | Scott |
| 2018/0141160 | A1 | 5/2018 | Karp et al. |
| 2018/0207750 | A1 | 7/2018 | Carter |
| 2018/0326485 | A1 | 11/2018 | Brown |
| 2018/0370144 | A1 | 12/2018 | Revanur et al. |
| 2019/0022946 | A1 | 1/2019 | Jones et al. |
| 2019/0118481 | A1 | 4/2019 | Brown |
| 2019/0283332 | A1 | 9/2019 | Brown et al. |
| 2020/0262152 | A1 | 8/2020 | Dardis et al. |
| 2020/0276669 | A1 | 9/2020 | Dardis et al. |
| 2021/0146447 | A1 | 5/2021 | Jones et al. |

FOREIGN PATENT DOCUMENTS

| | | | |
|---|---|---|---|
| EP | 3 351 323 | A1 | 7/2018 |
| WO | 94/15265 | A1 | 7/1994 |
| WO | 2010/007396 | A1 | 1/2010 |
| WO | 2017/085469 | A1 | 5/2017 |
| WO | 2017/085470 | A1 | 5/2017 |
| WO | 2017/187147 | A1 | 11/2017 |
| WO | 2018087556 | A1 | 5/2018 |
| WO | 2019/092414 | A1 | 5/2019 |
| WO | 2019092415 | A1 | 5/2019 |

OTHER PUBLICATIONS

Jun. 23, 2020 International Search Report issued in International Patent Application No. PCT/GB2020/050461.

Jun. 23, 2020 Written Opinion of the International Searching Authority issued in International Patent Application No. PCT/GB2020/050461.

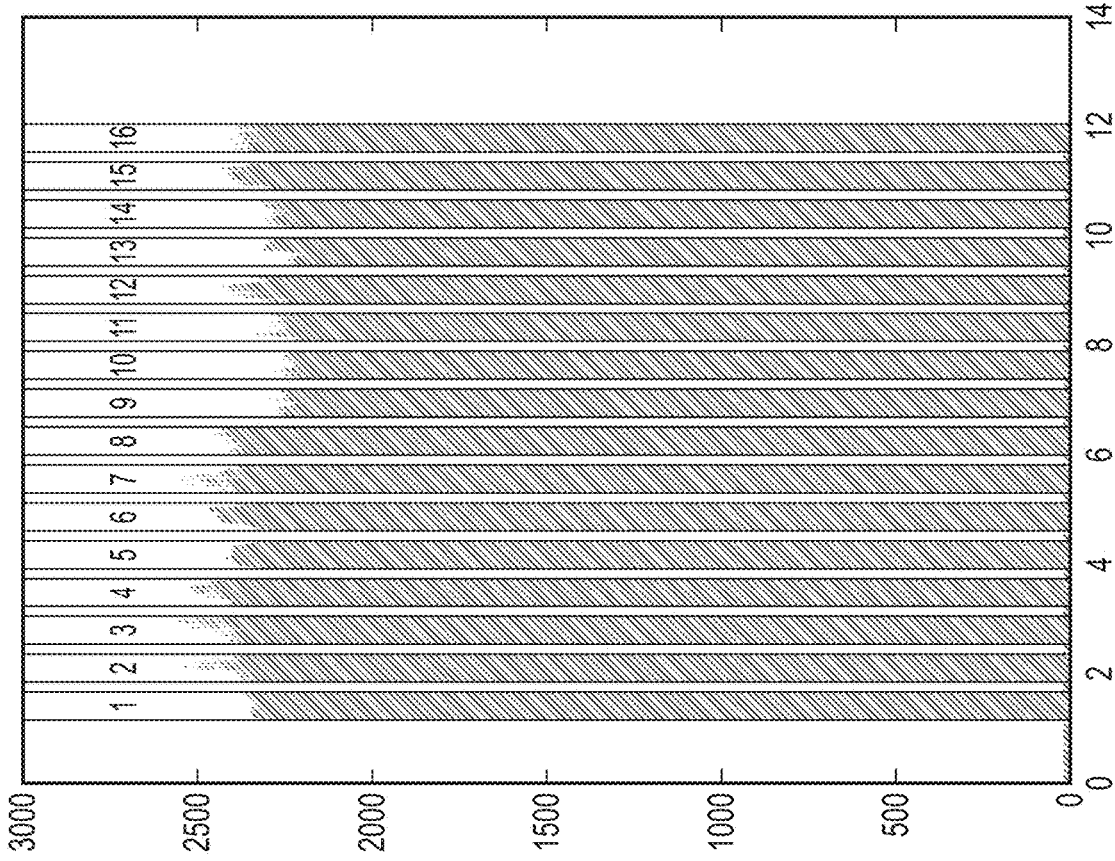
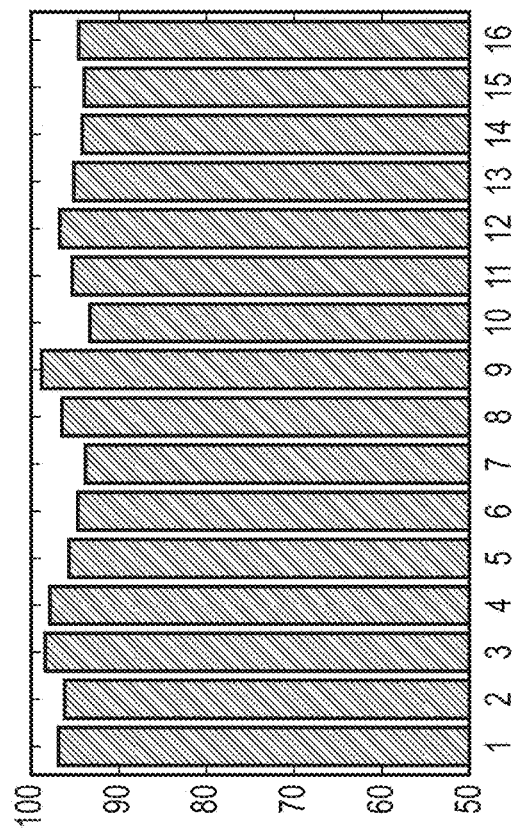
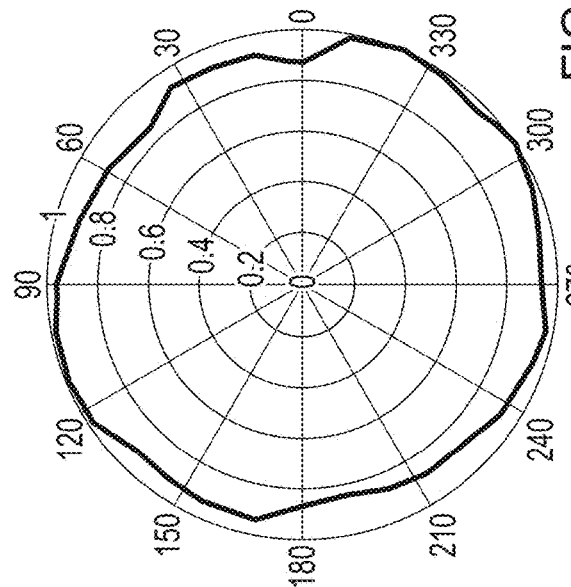
FIG. 13a
FIG. 13b
FIG. 13c

ON-AXIS MELT POOL SENSORS IN AN ADDITIVE MANUFACTURING APPARATUS

FIELD OF INVENTION

This invention concerns improvements in or relating to on axis melt pool sensors in an additive manufacturing apparatus, in particular an additive manufacturing apparatus which melts material using a laser. The invention has particular, but not exclusive, application to a laser-based powder bed fusion apparatus and more particularly, a powder bed fusion apparatus comprising multiple optical trains, each optical train for independently steering a laser beam and at least one of the optical trains comprising an on-axis melt pool sensor.

BACKGROUND

Powder bed fusion apparatus produce objects through layer-by-layer solidification of a material, such as a metal powder material, using a high-energy beam, such as a laser beam. A powder layer is formed across a powder bed contained in a build sleeve by lowering a build platform in the build sleeve to lower the powder bed, dosing a heap of powder adjacent to the lowered powder bed and spreading the heap of powder with a recoater across (from one side to another side of) the powder bed to form the layer. Portions of the powder layer corresponding to a cross-section of the workpiece to be formed are then solidified through irradiating these areas with the beam. The beam melts or sinters the powder to form a solidified layer. After selective solidification of a layer, the powder bed is lowered by a thickness of the newly solidified layer and a further layer of powder is spread over the surface and solidified, as required.

During selective laser melting of material, in particular metals, the melt pool emits a hot, high-speed vapour plume that cools to form a fine mist of metal 'condensate' nanoparticles. In addition, larger irregular spatter particles are ejected from the boiling melt pool. Furthermore, the pressure drop caused by the motion of the vapour plume draws in powder near the melt pool, casting it upwards away from the powder bed.

WO2017/085470 discloses an optical module comprising a plurality of optical trains for independently steering a plurality of laser beams onto a powder bed.

International patent application WO2019/092414 discloses a detector module that can be mounted to an optical module, such as that disclosed in WO2017/085470, in order to detect radiation emitted from the melt pool region during melting of the powder and collected by the optical train. For example, the radiation may be radiation emitted by the melt pool itself (typically infra-red wavelengths) or radiation emitted by the plasma plume produced above the melt pool during melting (typically visible wavelengths). The detector module comprises a flexure for adjusting a relative position of an optical axis of the sensor to the mounting position on the optical module.

It has been found that changing a direction of a scan of the laser beam across the powder bed affects the intensity of the signal generated by an on-axis melt pool sensor, even when a change in conditions at the melt pool are expected to be small for the change in scan direction. This change in intensity can result in an intensity of the signal for some scan directions being so low that variations in the signal indicating anomalies, such as splatter particles or porosity, are obscured by the underlying noise in the signal.

SUMMARY OF INVENTION

According to a first aspect of the invention there is provided a method of aligning an on-axis melt pool sensor in an additive manufacturing apparatus comprising scanning a first laser beam along a first scan path across a working surface using a first optical train to generate a melt pool along the first scan path and scanning a field of view of an on-axis sensor along a second scan path across the working surface using a second optical train for steering a second laser beam, wherein the first and second scan paths intersect, and determining an adjustment to be made to an alignment of the field of view of the on-axis sensor with an optical axis of the second optical train from a variation in the signal generated by the on-axis sensor as the field of view is scanned along the second scan path.

In this way, an alignment of the field of view of the on-axis melt pool sensor with the optical axis can be made to compensate for misalignments of the field of view with emissions generated by the second laser beam when the second laser beam is used to form a melt pool. The alignment may comprise moving an image plane relative to the on axis melt pool sensor, which is maintained in a fixed position, or moving the on-axis melt pool sensor relative to a fixed image plane. This may prevent dips in intensity of the signal for certain scan directions of the second laser beam. For a calibrated system, the one or more expected intersection points of the first and second scan paths is known. However, due to misalignment of the field of view of the on-axis sensor with the optical axis of the second optical train, the melt pool generated by the first laser beam may not be centred in the field of view at the one or more expected intersection points but may be centred within the field of view before or after the one or more expected intersection points. Actual locations where the melt pool generated by the first laser beam is centred in the field of view of the on-axis sensor can be determined from an attribute, such as intensity of the signal generated by the on-axis sensor. This mismatch between the actual location(s) and the expected intersection point(s) can be used to determine an adjustment to be made to the alignment of the field of view of the on-axis sensor to the optical axis of the second optical train. Such an alignment may be made manually, for example by an operator or service personnel, by adjusting an alignment mechanism, such as a flexure, associated with the on-axis sensor to adjust a position of the field of view of the on-axis sensor relative to the optical axis of the second optical train. The method may comprise generating an output, such as a display on a screen, indicating an adjustment to be made. Alternatively, the additive manufacturing apparatus may comprise a motorised system for adjusting an alignment of the field of view of the on-axis sensor relative to the optical axis and the method may comprise controlling the motorised system to adjust a position of the field of view of the on-axis sensor relative to the optical axis of the second optical train.

It will be understood that the term "intersect" as used herein means in space and time. Hence, the movement of the first laser beam and the field of view may be moved spatially relative to each other and timed such that the melt pool falls within the field of view at points along their travel along the first and second scan paths.

The on-axis sensor may comprise an integrating sensor, such as a photodiode, which generates a signal by integrating the signal over the field of view and the attribute is intensity of the signal generated by the integrating sensor. In an alternative embodiment, the on-axis sensor is a position sensitive device (PSD), such as a CCD or CMOS device, which may generate a spatial representation of the intensity in the field of view. In this alternative embodiment, the attribute may be intensity, either integrated across the field of view or at a specified location, such as a centre of the PSD, or an attribute of the melt pool and/or plume derivable from the spatial representation of the intensity in the field of view, such as a measure of whether the melt pool and/or plume is centred on the PSD, for example an area of the melt pool and/or plume that falls within the field of view. Alignment of the field of view of an on-axis sensor comprising an array of photodetector elements may comprise selecting a subset of the photodetector elements of the array from which values are recorded, for example such that the field of view of the subset of photodetector elements is aligned with the optical axis of the second optical train. For example, the entire array may be sufficiently large such that, even with misalignment, the area if interest (melt pool and plume) falls on the photodetector array. However, to read out the values from all photodetector elements of such a large array may be unduly slow. Accordingly, alignment may comprise selecting a subset of the photodetector values from which to read-out values based upon the adjustment determined in accordance with the first aspect of the invention. The selected subset of photodetector elements may be those that image the melt pool and/or plume. Reading-out values only from the subset of photodetector elements may allow faster read-out speeds compared to reading out values from all the photodetector elements of the array. Fast read-out rates are advantageous in additive manufacturing when an operator wants to obtain feedback on the evolution of the melt pool/plume within a time comparable to the solidification time of the melt pool.

The second scan path may comprise a change in scanning direction across the working surface, for example the scan path may include scanning in a first direction and scanning in a second direction orthogonal to the first direction. In this way, information on the misalignment of the field of view with the optical axis of the second optical train can be obtained for orthogonal directions (X and Y). The second scan path may comprise an oscillating scan path, such as a sinusoidal scan path. The second scan path may start and finish in the same place, for example a superposition of an oscillating scan path on a closed contour, such as a circular path.

A second scan path having smooth transitions between directions is preferable in order that movement is within the dynamic capabilities of steering optics of the second optical train.

The first scan path may be symmetrical with the second scan path (about a reflection or rotation). In this way, synchronisation of the first laser beam and the field of view is maintained. In one embodiment, the first and second scan paths are oscillating scan paths that are $\pi$ out of phase.

The method may comprise for each of a plurality of optical trains of an additive manufacturing apparatus, aligning a field of view of a corresponding on-axis melt pool sensor with the optical axis of the optical train using the method according to the first aspect of the invention. The first laser beam used for determining an alignment of the field of view of the on axis melt pool sensor for two or more of the optical trains may be the same laser beam.

In one embodiment, the additive manufacturing apparatus comprises three or more optical trains, for example four optical trains, each for steering a corresponding laser beam to a working surface, the method comprising scanning the first laser beam along the first scan path across a working surface using a first one of the optical trains to generate a melt pool along the first scan path and scanning a field of view of an on-axis sensor along a second scan path across the working surface using a second one of the optical trains for steering a second laser beam, wherein the first and second scan paths intersect, and scanning a third laser beam along a third scan path across a working surface using a third one of the optical trains to generate a melt pool along the third scan path and scanning the field of view of the on-axis melt pool sensor along a fourth scan path across the working surface using the second one of the optical trains, wherein the third and fourth scan paths intersect and determining an adjustment to be made to an alignment of the field of view of the on-axis sensor with the optical axis of the second optical train from a variation in the signal generated by the on-axis sensor as the field of view is scanned along the second and fourth scan paths.

According to a second aspect of the invention there is provided an additive manufacturing apparatus for layer-by-layer manufacture of an object by laser melting comprising a first optical train comprising a first movable optical component for steering a first laser beam across a working surface, a second optical train comprising a second movable optical component for steering a second laser beam across the working surface, an on-axis melt-pool sensor for detecting radiation emitted by the melt pool and collected by the second movable optical component of the second optical train, and a controller arranged to control the first and second movable components of the first and second optical trains to scan the first laser beam along a first scan path across the working surface using the first optical train to generate a melt pool along the first scan path, to scan a field of view of the on-axis sensor along a second scan path across the working surface using the second optical train, wherein the first and second scan paths intersect, and determining an adjustment to be made to an alignment of the field of view of the on-axis sensor with an optical axis of the second optical train from a variation in the signal generated by the on-axis sensor as the field of view is scanned along the second scan path.

The additive manufacturing apparatus may comprise a third optical train comprising a third movable optical component for steering a third laser beam across the working surface, the controller arranged to scan the third laser beam along a third scan path across a working surface using the third optical train to generate a melt pool along the third scan path and to scan the field of view of the on-axis sensor along a fourth scan path across the working surface using the second optical train, wherein the third and fourth scan paths intersect, and determining an adjustment to be made to an alignment of the field of view of the on-axis sensor with the optical axis of the second optical train from a variation in the signal generated by the on-axis sensor as the field of view is scanned along the second and fourth scan paths.

The additive manufacturing apparatus may comprise an adjustment mechanism for adjusting a position of the field of view of the on-axis melt pool sensor relative to the optical axis of the second optical train. The adjustment mechanism may be manually adjustable and the additive manufacturing apparatus comprises a display, the controller arranged to control the display to output an indication of the adjustment to be made to an alignment of the field of view of the on-axis sensor with an optical axis of the second optical train. Alternatively or additionally, the adjustment mechanism may comprise a motor and drive mechanism for moving optics of a detector module comprising the on-axis melt pool sensor and/or the on-axis melt pool sensor, the controller arranged to control the motor to align the field of view of the on-axis sensor with an optical axis of the second optical train based upon the determined alignment.

The additive manufacturing apparatus may comprise a position sensor, such as an encoder, for measuring a position of the optics of the detector module and/or the on-axis melt pool sensor relative to the optical axis of the second optical train. The controller may control the display to provide feedback on the position of the on-axis sensor and/or control the motor based upon signals from the position sensor.

The additive manufacturing apparatus may comprise a powder bed fusion additive manufacturing apparatus comprising a build platform lowerable in a build sleeve and a layer formation device for forming layers of powder across the build platform to form a powder bed, wherein the working surface is an upper surface of the powder bed. However, in an alternative embodiment, the working surface is an upper surface of the build substrate plate or a sacrificial plate mounted on the build platform.

The movable optical components may comprise optical components, such as mirrors, rotatable about an axis under the control of a motor. Alternatively or additionally, the movable optical components may comprise optical components, such as mirrors, movable along linear axes, such as on a gantry system.

According to a third aspect of the invention there is provided a controller for an additive manufacturing apparatus for layer-by-layer manufacture of an object by laser melting, the additive manufacturing apparatus comprising a first optical train comprising a first movable optical component for steering a first laser beam across a working surface, a second optical train comprising a second movable optical component for steering a second laser beam across the working surface, an on-axis melt-pool sensor for detecting radiation emitted by the melt pool and collected by the second movable optical component of the second optical train, the controller configured to control the additive manufacturing apparatus to carry out the method according to the first aspect of the invention.

According to a fourth aspect of the invention there is provided a data carrier having instruction stored thereon, which when executed by a controller of an additive manufacturing apparatus for layer-by-layer manufacture of an object by laser melting, additive manufacturing apparatus comprising a first optical train comprising a first movable optical component for steering a first laser beam across a working surface, a second optical train comprising a second movable optical component for steering a second laser beam across the working surface, an on-axis melt-pool sensor for detecting radiation emitted by the melt pool and collected by the second movable optical component of the second optical train, cause the controller to control the additive manufacturing apparatus to carry out the method according to the first aspect of the invention.

According to a fifth aspect there is provided a method of normalising signals from a plurality of on-axis melt pool sensors in an additive manufacturing apparatus comprising multiple optical trains, wherein each optical train is arranged for independently steering a corresponding laser beam to a working surface and each melt pool sensor is arranged to view the working surface through a corresponding one of the optical trains, the method comprising:

forming a melt pool on the working surface using a one of the corresponding laser beams;

controlling a first one of the optical trains such that the melt pool falls within a field of view of a first one of the melt pool sensors, which views the working surface through the first one of the optical trains, and recording a first signal with a first one of the melt pool sensors;

controlling a second one of the optical trains such that the melt pool, or a further melt pool generated on the working surface using a one of the corresponding laser beams with scanning parameters set to achieve the same predetermined fluence at the working surface as that used to form the melt pool, falls within a field of view of a second one of the melt pool sensors, which views the working surface through the second one of the optical trains, and recording a second signal with the second one of the melt pool sensors; and comparing the first and second signals and determining a scaling for signals from one or both melt pool sensors based upon the comparison.

In this way, the response of the on-axis melt-pool sensors can be adjusted such that both the first and second melt pool sensors give the same response for a melt pool formed under the same fluence conditions. In this way, the signals from the first and second melt-pool sensors can be displayed/processed together without the generation of artefacts as a result of differential responses between the first and second melt pool sensors for the same melting conditions.

In a preferred embodiment, the second optical train is controlled such that second melt pool sensor views the same melt pool as the first melt pool sensor. In this way, any differences in the melt pool viewed by the first and the second melt pool sensors is reduced or eliminated. It will be understood however, that in another embodiment the second optical train is controlled such that second melt pool sensor views a different melt pool but formed under the same fluence conditions. It would be expected that this further melt pool would generate substantially the same melt pool and plume and therefore, substantially the same response from the melt pool sensors, allowing the scaling to be determined from a comparison of the first and second signals. This may be necessary, for example, if scan fields of the first and second optical trains do not overlap.

The scaling may be selected such that the first and second signals become equal after scaling.

The method may comprise carrying out the above method a plurality of times to obtain a plurality of pairs of first and second signals. Each pair of first and second signals may be obtained for different positions of the melt pool and/or the further melt pool on the working surface. For example, the melt-pool sensor response may differ for different locations of the melt pool on the working surface because of changes in the laser spot shape and/or changes in transmission of the emitted energy through optical components of the optical trains, such as an f-theta lens. Accordingly, it may be desirable to determine scalings for the melt-pool sensor signals as a function of position of the melt pool on the working surface. Each pair of first and second signals may be obtained for melt pools/further melt pools formed by different laser beams. Different laser beams may result in slightly different melt pool sensor responses and hence, it may be desirable to determine different scalings for melt pools generated using different laser beams.

This method may be carried out after alignment of the first and second melt pool sensors with an optical axis of the corresponding first and second optical trains, for example using the method of the first aspect of the invention.

According to a to a sixth aspect of the invention there is provided an additive manufacturing apparatus for layer-bylayer manufacture of an object by laser melting comprising a plurality of optical trains, each optical train comprising movable optical components for steering a corresponding laser beam across a working surface, a first on-axis melt-pool sensor for detecting radiation emitted by a melt pool and collected by movable optical components of a first one of the optical trains, a second on-axis melt-pool sensor for detecting radiation emitted by the or a further melt pool and collected by movable optical components of a second one of the optical trains, and a controller arranged to:

form a melt pool on the working surface using a one of the corresponding laser beams;

control the first one of the optical trains such that the melt pool falls within a field of view of the first melt pool sensor and recording a first signal with the first melt pool sensor;

control the second one of the optical trains such that the melt pool, or a further melt pool generated on the working surface using a one of the corresponding laser beams with scanning parameters set to achieve the same predetermined fluence at the working surface as that used to form the melt pool, falls within a field of view of the second melt pool sensor and recording a second signal with the second one of the melt pool sensors; and compare the first and second signals and determining a scaling for signals from one or both melt pool sensors based upon the comparison.

According to a seventh aspect of the invention there is provided a controller for an additive manufacturing apparatus for layer-by-layer manufacture of an object by laser melting, the additive manufacturing apparatus comprising a first optical train comprising a first movable optical component for steering a first laser beam across a working surface, a second optical train comprising a second movable optical component for steering a second laser beam across the working surface, a first on-axis melt-pool sensor for detecting radiation emitted by the melt pool and collected by the first movable optical component of the first optical train and a second on-axis melt-pool sensor for detecting radiation emitted by the melt pool and collected by the second movable optical component of the second optical train, the controller configured to control the additive manufacturing apparatus to carry out the method according to the fifth aspect of the invention.

According to an eighth aspect of the invention there is provided a method of mapping position measurements generated by a position sensor measuring a position of a movable optical component of an optical train of an additive manufacturing apparatus to positions of a spot of a laser beam steered by the movable optical component on a working surface, the method comprising forming marks on a working surface by scanning the laser beam over the working surface using the movable optical component, recording position measurements generated by the position sensor during the formation of the marks, using an imaging device to measure a position of the marks on the working surface and generating a map that maps position measurements from the position sensor to a position on the working surface based upon the position measurements generated by the position sensor during the formation of the marks and the measured positions of the marks on the working surface.

In this way, a position of the laser beam on the working surface can be determined from the position measurements. The movable optical component may comprise an optical component, such as a mirror, rotatable about an axis, and the position sensor a rotary encoder for measuring positions of the optical component about the axis. A position of the laser beam on the working surface may be dictated by an angle of the optical component about the axis but also by deflections of the laser beam along the optical axis for that position of the optical component. Accordingly, to derive an accurate position on the working surface from a position sensor measuring a position of the movable optical component, it is advantageous to calibrate the optical train as a whole. The method provides a mapping of the position measurements of the movable optical elements to positions in a planar working surface that take into account of sources of error throughout the optical train.

The map may be generated by interpolating between points on the working surface where the marks are made and for which position measurements are recorded to generate a map for other positions of the laser beam on the working surface.

The optical train may comprise two movable optical components for steering the laser beam in perpendicular directions, each movable optical component having a position sensor associated therewith and the method comprises recording position measurements generated by each position sensor during the formation of the marks and generating a map that maps position measurements from the position sensor to a two-dimensional position on the working surface based upon the position measurements generated by the position sensors during the formation of the marks and the measured positions of the marks on the working surface.

According to a ninth aspect of the invention there is provided a method of aligning an on-axis melt pool sensor in an additive manufacturing apparatus comprising scanning a laser beam along a plurality of scan paths across a working surface using an optical train to generate melt pools along the plurality of scan paths, ones of the scan paths extending in different directions in a plane of the working surface, recording sensor values using an on-axis sensor which views the melt pools through the optical train and determining an adjustment to be made to an alignment of the field of view of the on-axis sensor with an optical axis of the optical train from a variation in the sensor values generated by the on-axis sensor with direction of the scan paths.

This method may allow alignment of the on-axis melt pool sensor without requiring a further optical train for delivering a further laser beam to the working plane. This may be necessary in a machine comprising only one laser scanner, although it will be understood that this aspect of the invention is not limited to single laser machines.

The plurality of scan paths may comprises sets of opposed scan paths, each set comprising at least one first scan path extending in a first direction in a plane of the working surface and at least one second scan path extending in a second direction antiparallel to the first direction, the opposed scan paths between sets extending in transverse directions. Determining the adjustment may comprise determining from at least one of the sets of scan paths, a difference in the measure for the at least one first scan path and for the at least one second scan path, and the adjustment is determined from the difference.

The controller may be arranged to determine for each of the sets of scan paths, a difference in the measure for the at least one first scan path and for the at least one second scan path, and identify a direction of the adjustment from the differences.

The adjustment may be based upon the first and second directions of the set of opposed scan paths having the greatest difference between the measures determined for the at least one first scan path and the at least one second scan path. A direction of the adjustment may be determined from a sign of the difference.

According to a tenth aspect of the invention there is provided an additive manufacturing apparatus for layer-by-layer manufacture of an object by laser melting comprising an optical train comprising a movable optical component for steering a laser beam across a working surface, an on-axis melt-pool sensor for detecting radiation emitted by the melt pool and collected by the movable optical component of the optical train, and a controller arranged to control the movable components of the optical train to scan the laser beam along a plurality of scan paths across the working surface to generate melt pools along the plurality of scan paths, ones of the scan paths extending in different directions in a plane of the working surface, and to determine an adjustment to be made to an alignment of the field of view of the on-axis sensor with an optical axis of the optical train from a variation in sensor values generated by the on-axis sensor with direction of the scan paths.

The controller may be arranged to determine a measure for each scan path direction, the measure derived from a plurality of sensor values generated during scanning of the laser beam along that scan path direction and determine the adjustment form the determined measures.

The plurality of scan paths may comprise sets of opposed scan paths, each set comprising at least one first scan path extending in a first direction in a plane of the working surface and at least one second scan path extending in a second direction antiparallel to the first direction, the opposed scan paths between sets extending in transverse directions, and the controller may determine, for each set of opposed scan paths, a difference in the measure for the at least one first scan path and for the at least one second scan path, and the adjustment from the differences for the sets of opposed scan paths.

The adjustment may be based upon the first and second directions of the set of opposed scan paths having the greatest difference between the measures determined for the at least one first scan path and the at least one second scan path and a sign (whether it is positive of negative) of the difference.

Each set may comprise a plurality of first scan paths and a plurality of second scan paths.

According to an eleventh aspect of the invention there is provided a controller for an additive manufacturing apparatus for layer-by-layer manufacture of an object by laser melting, the additive manufacturing apparatus comprising an optical train comprising a movable optical component for steering a laser beam across a working surface, and an on-axis melt-pool sensor for detecting radiation emitted by the melt pool and collected by the movable optical component of the optical train, the controller configured to control the additive manufacturing apparatus to carry out the method according to the ninth aspect of the invention.

According to a twelfth aspect of the invention there is provided a data carrier having instruction stored thereon, which, when executed by a controller for an additive manufacturing apparatus for layer-by-layer manufacture of an object by laser melting, the additive manufacturing apparatus comprising an optical train comprising a movable optical component for steering a laser beam across a working surface, and an on-axis melt-pool sensor for detecting radiation emitted by the melt pool and collected by the movable optical component of the optical train, cause the controller to control the additive manufacturing apparatus to carry out the method according to the ninth aspect of the invention.

The data carrier may be a non-transient data carrier, such as volatile memory, e.g. RAM, non-volatile memory, e.g. ROM, flash memory and data storage devices, such as hard discs, optical discs, or a transient data carrier, such as an electronic or optical signal.

DESCRIPTION OF THE DRAWINGS

FIG. 4c shows how a signal response from the on-axis melt pool sensor may change with scanning direction when the field of view is misaligned with the laser beam as illustrated in FIG. 4a;

FIG. 13a is a plot showing on-axis sensor values for a well aligned on-axis sensor, FIG. 13b is a polar plot of the RMS value for each scan path direction and FIG. 13c is a graph showing the difference between the RMS sensor values for each set of opposed scan paths.

DESCRIPTION OF EMBODIMENTS

Figure 1:
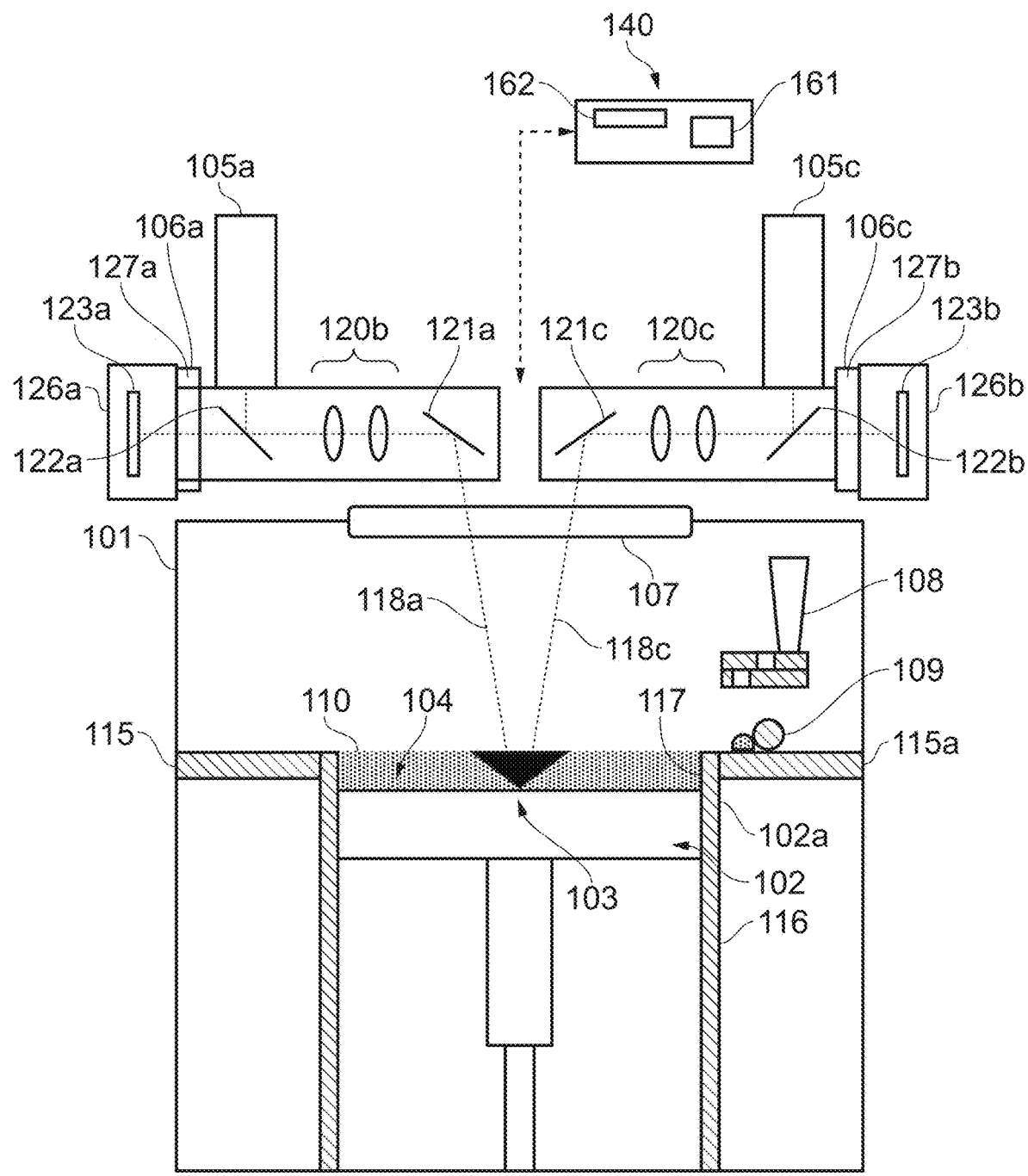
FIG. 1 shows an additive manufacturing apparatus according to an embodiment of the invention.
Figure 2:
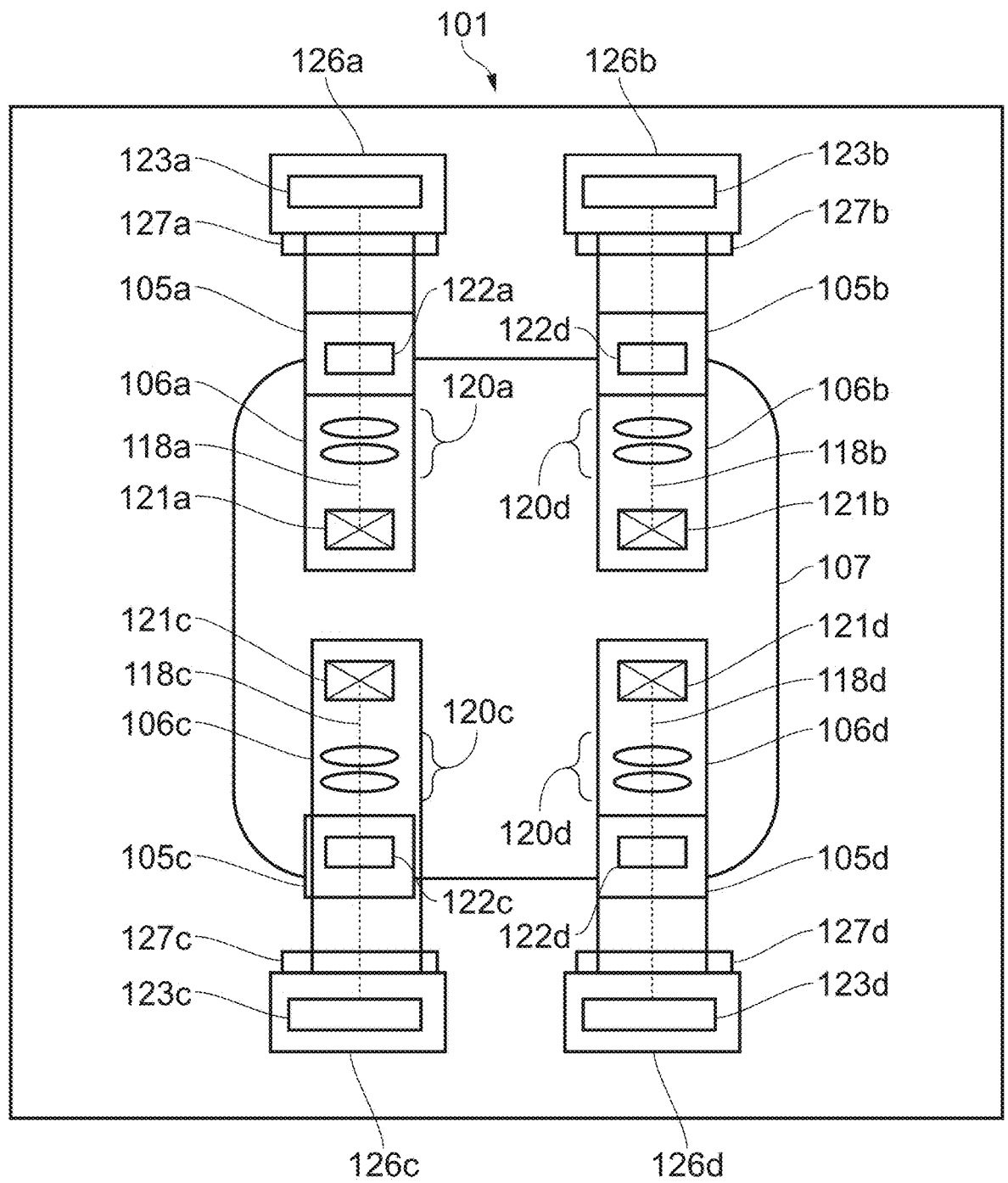
FIG. 2 is a plan view of the additive manufacturing apparatus shown in FIG. 1.

Referring to FIGS. 1 and 2, an additive manufacturing apparatus according to an embodiment of the invention comprises a build chamber 101 having therein partitions 115, 116 that define a build volume 117. A build platform 102 is lowerable in the build volume 117. The build platform 102 supports a build substrate plate 102a, a powder bed 104 and workpiece 103 as the workpiece is built by selective laser melting of the powder. The platform 102 is lowered within the build volume 117 under the control of a motor (not shown) as successive layers of the workpiece 103 are formed.

Layers of powder 104 are formed as the workpiece 103 is built by dispensing apparatus 108 and a wiper 109. For example, the dispensing apparatus 108 may be apparatus as described in WO2010/007396. The dispensing apparatus 108 dispenses powder onto an upper surface 115a defined by partition 115 and is spread across the powder bed by wiper 109. A position of a lower edge of the wiper 109 defines a working surface 110 at which powder is consolidated.

Figure 3:
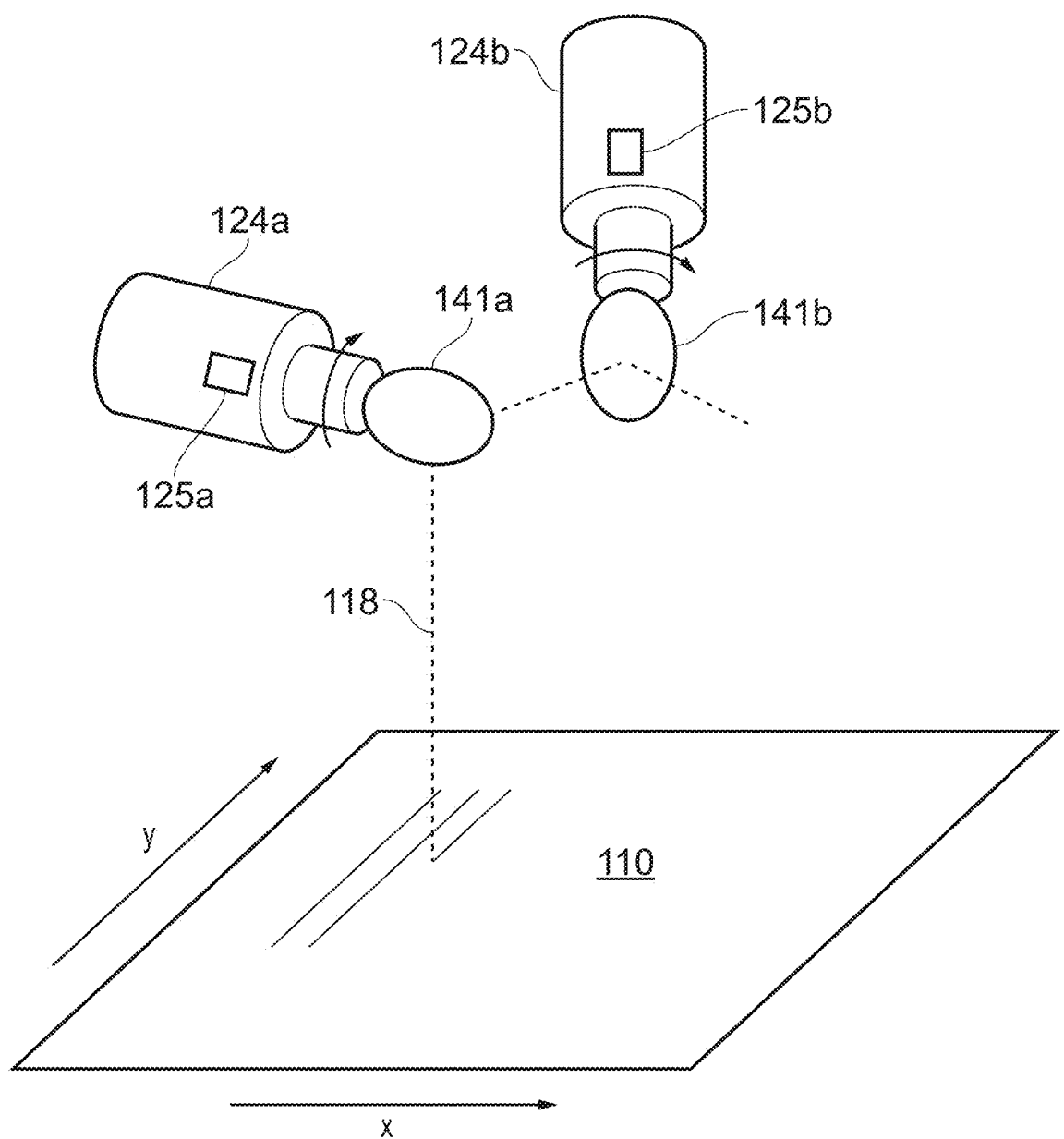
FIG. 3 is a perspective view of a laser beam steering system used in the apparatus shown in FIGS. 1 and 2.

A plurality of laser modules 105a, 105b, 105c and 105d generate laser beams 118a, 118b, 118c, 118d for melting the powder 104, the laser beams 118a, 118b, 118c, 188d steered as required by a corresponding optical module 106a, 106b, 106c, 106d. The laser beams 118a, 118b, 118c, 118d enter through a common laser window 107. Each optical module comprises steering optics 121, such a two mirrors 141a, 141b mounted on galvanometers 124a, 124b (see FIG. 3), for steering the laser beam 118 in perpendicular directions, X and Y, across the working plane 110 and focussing optics 120, such as two movable lenses for changing the focus of the laser beam 118. The scanner is controlled such that the focal position of the laser beam 118 remains in the same plane 110 as the laser beam 118 is moved across the working plane 110. Rather than maintaining the focal position of the laser beam in a plane using dynamic focusing elements, an f-theta lens may be used. Angular position sensors 125a, 125b are integrated into each galvanometer 124a, 124b for measuring an angular position of the corresponding mirror 121a, 121b.

Each optical module 106a, 106b, 106c, 106d comprises a beam splitter 122 which reflects the laser beam 118 and transmits wavelengths of radiation coming from the working plane 110 of the powder bed 104. The beam splitter 122 may be arranged to transmit wavelengths that differ from a wavelength of the laser beam. The radiation that passes through the beam splitter 122 is delivered to a detector module 126 and imaged by an on-axis melt pool sensor 123 in the form of a one or more photodetector elements. The melt pool sensor 123 may be a single photodetector that integrates the intensity over the field of view or a position sensitive device, such as a CCD. The optical system may comprise further filters for filtering out wavelengths that are not of interest before the radiation is incident on the melt pool sensor 123. For example, only visible light may be of interest, such as that emitted by the plasma, or light in the infrared spectrum that arises from thermal emissions from the melt pool/plasma.

The detector module 126 is mounted onto the optical module 106 by a flexure 127, which allows a position of the optics of the detector module, and therefore a position of an image plane relative to the sensor 123, to be adjusted relative to an optical axis of the optical module 106. In this embodiment, the flexure 126 is as described in International patent application WO2019/092414, which is incorporated herein by reference.

A controller 140, comprising processor 161 and memory 162, is in communication with modules of the additive manufacturing apparatus, namely the laser modules 105a, 105b, 105c, 105d, optical modules 106a, 106b, 16c, 106d, build platform 102, dispensing apparatus 108, wiper 109 and sensors 123a, 123b, 123c, 123d, 125a, 125b. The sensor data is reported to the controller 140 in the manner described in WO2018/087556. This allows the sensor data from different detector modules 126a to 126d to be correlated within a common time reference frame. The controller 140 controls the modules based upon software stored in memory 162 as described below.

For a melt-pool sensor 123 having photodetector elements that image a region that is smaller than or comparable to the region of interest, such as the melt pool or the plasma plume generated during formation of the melt pool, an alignment of the region imaged by sensor 123 and the laser spot will have an effect on the intensity of a signal produced by the sensor 123. Misalignment can result in the sensor signal being dependent on scanning direction as illustrated with reference to FIGS. 4a, 4b and 4c.

Figure 4A:
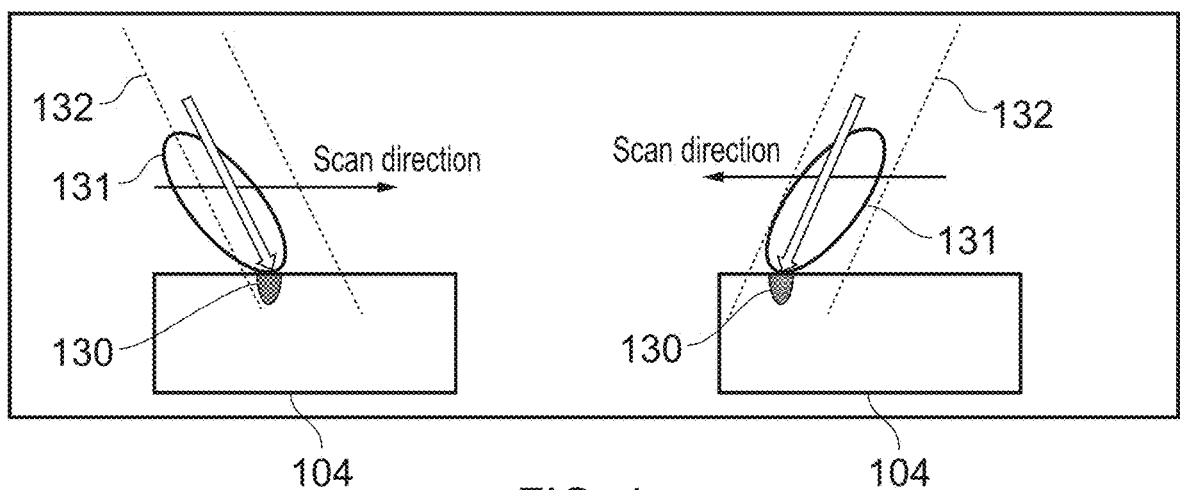
FIG. 4a shows a field of view of an on-axis melt pool sensor relative to a melt pool and plume generated by formation of the melt pool for different scan directions when the field of view is misaligned with the optical axis of the laser beam.

FIG. 4a shows the laser beam 118 hitting powder bed 104 to form melt pool 130. Formation of the melt pool 130 also results in a plume 131 above the powder bed 104 formed of a plasma and particles ejected from the bed. A field of view 132 of the sensor 123 is misaligned with the laser beam 118 (in the drawings, the laser beam 118 being slightly to the left of the centre of the field of view 132). For the scanning direction left to right, the plume is only partially within the field of view 132, whereas for the scanning direction right to left, all the plume is within the field of view. This can result in a lower intensity signal being generated by the melt pool sensor for the same melting condition for one scanning direction compared to the other despite the conditions at the bed being substantially the same.

Figure 4B:
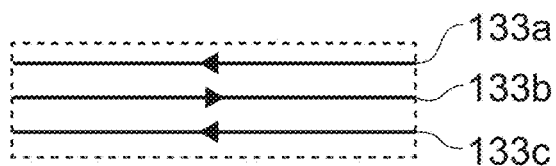
FIG. 4b shows a typical hatch scanning strategy used in additive manufacturing.
Figure 4C:
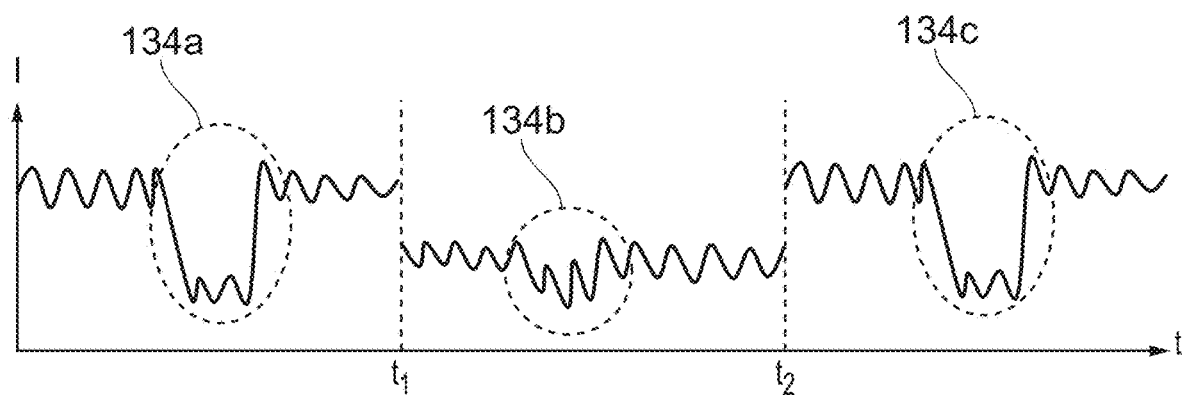

This is further illustrated by FIGS. 4b and 4c. FIG. 4b shows a series of hatch lines 133a, 133b, 133c to be scanned by the laser beam 118. During scanning of the hatch lines 133a, 133b, 133c, the melt pool sensor 123 generates signals based upon the melt pool and plume. FIG. 4c illustrates typical signals that might be generated by a sensor 123 if a spatter particle is present along the hatch lines 133a, 133b and 133c. Hatch line 133a is scanned up to time $t_1$, hatch line 133b is scanned between times $t_1$ and $t_2$ and hatch line 133c is scanned after time $t_2$. The presence of the spatter particle causes a drop in the signal from the melt pool sensor 123, indicated at 134a, 134b and 134c. However, due to the misalignment of the field of view 132 with the laser beam 118, an intensity of the signal from the melt-pool sensor for hatch line 133b is less than the intensity of the signals for the melt-pool sensor for hatch lines 133a and 133c, despite the hatch lines being formed under the same melt conditions. Furthermore, the reduction in intensity during the scanning of hatch line 133b may be such that the drop in signal intensity due to the spatter particle is obscured by the noise in the signal.

Figure 5:
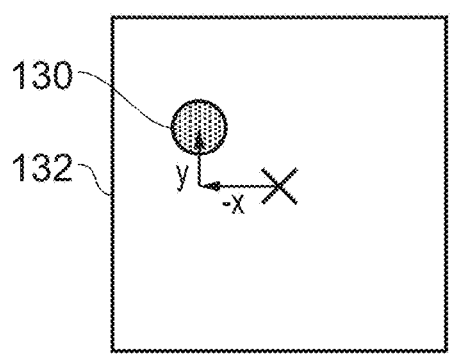
FIG. 5 is an illustration of a misalignment of the field of view with the laser spot in two-dimensions.

FIG. 5 illustrates how the field of view 132 may be misaligned with the laser beam 118 such that a centre of the field of view (as indicated by the "X") is offset from the laser beam 118 in both x- and y-directions.

Figure 6A:
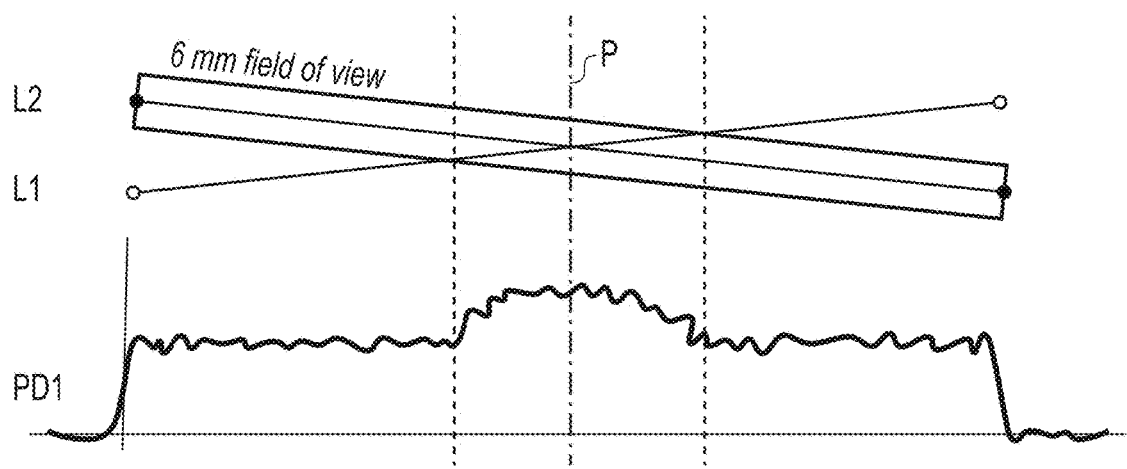
FIGS. 6a to 6c illustrate a method for determining a misalignment of the field of view with the optical axis of the laser beam for one-dimension.
Figure 6B:
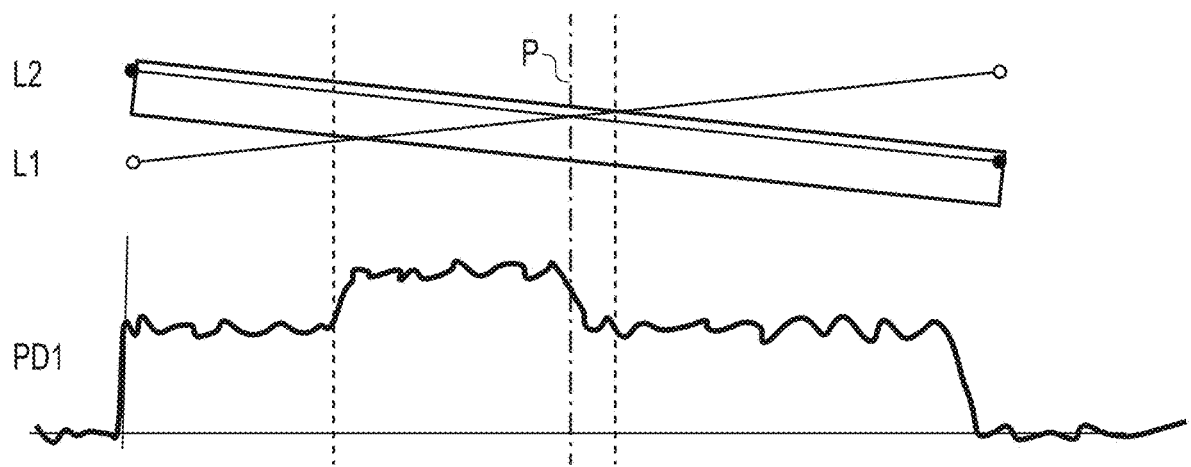
Figure 6C:
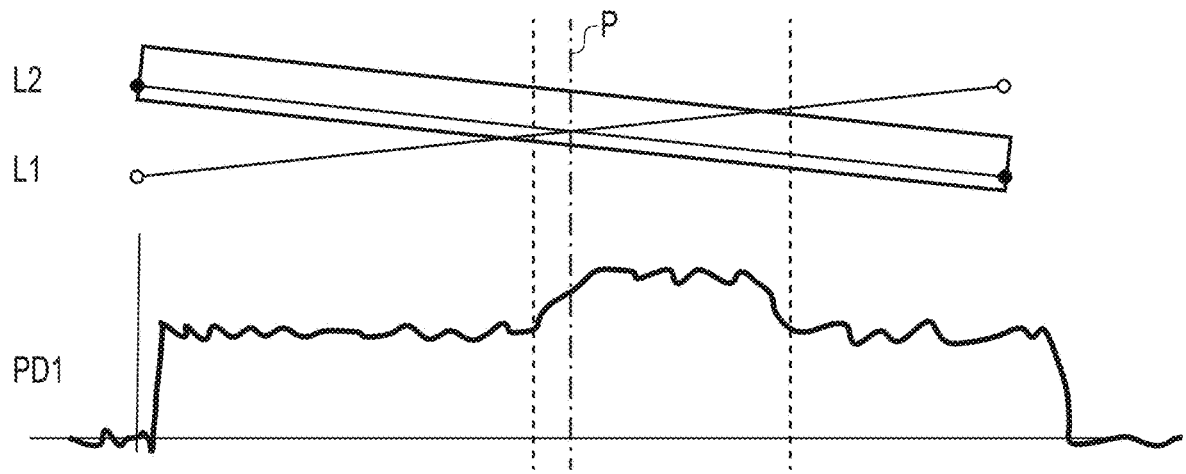

Referring to FIGS. 6a to 6c, to determine a correction for a misalignment of the field of view 132 with the laser beam 118, a first (different) laser beam is scanned along a first scan path L1 across the working surface using a first one of the optical modules 106a to 106d to generate a melt pool along the first scan path. The field of view 132 of an on-axis sensor 135 is scanned along a second scan path L2 across the working surface using a second one of the optical trains 106a to 106d for steering a second laser beam. The first and second scan paths, L1 and L2, intersect at a point P. During the scanning of the first laser beam and the field of view 132, signals from the melt pool sensor 123 are recorded.

FIG. 6a shows a typical output signal from the melt pool sensor 123 if the field of view 132 is centred about the second laser beam in a direction perpendicular to the scan direction. In this circumstance, the signal from the melt pool sensor 123 peaks about the intersection point P.

FIGS. 6b and 6c shows typical output signals from the melt pool sensor 123 if the field of view 132 is positioned off-centre with respect to the second laser beam in a direction perpendicular to the scan direction. In this circumstance, the peak is shifted to one side of the intersection point P. The direction the peak is shifted can be correlated with the direction in which the centre of the field of view 132 is offset from the second laser beam in a direction perpendicular to the scan direction.

A misalignment of the peak with the intersection point P is used to determine an adjustment to be made to an alignment of the sensor 123 with the optical axis of the corresponding optical module 106. For example, the required adjustment may be output to a display (not shown). An operator can then adjust a position of the sensor 123 relative to an optical axis of the optical module 106 using the flexure 127 based upon the displayed adjustment.

The process may be carried out iteratively until the field of view is centred about the second laser beam within an acceptable tolerance (any shift in the peak from the point of intersection is sufficiently small as to fall within an acceptable tolerance/noise).

Figure 7:
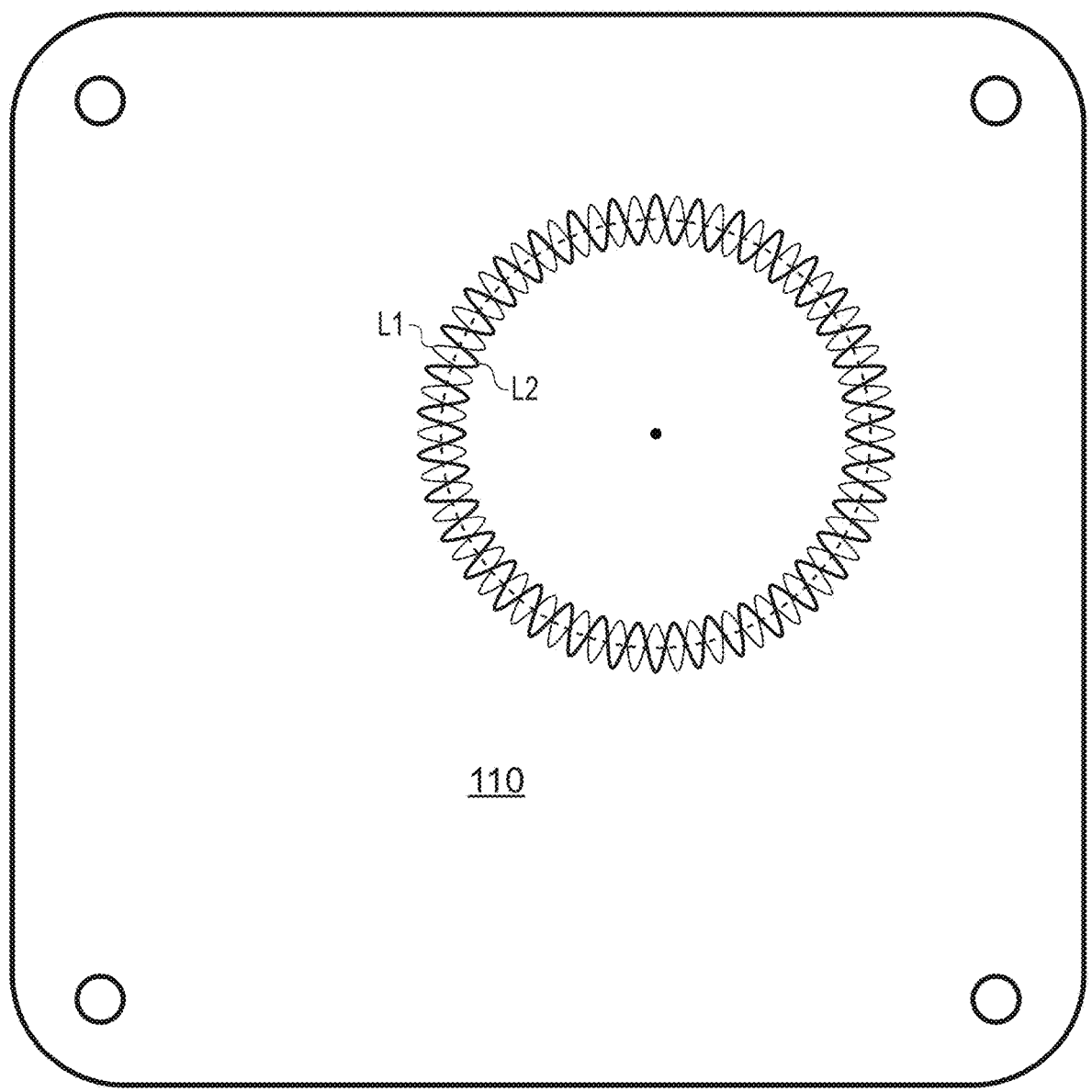
FIG. 7 illustrates a scanning strategy for determining a misalignment of the field of view with the optical axis of the laser beam for two-dimensions.

Referring to FIG. 7, to determine a two-dimensional adjustment of the alignment of the sensor 123 with an optical axis of the optical module 106, the first and second scan paths L1, L2 comprise oscillating scan paths that intersect at a plurality of locations (indicated by the dotted line). In this embodiment, the scan paths, L1 and L2 prescribe a "gear wheel" shape with the two scan paths oscillating about a circle and being π out of phase.

Figure 8A:
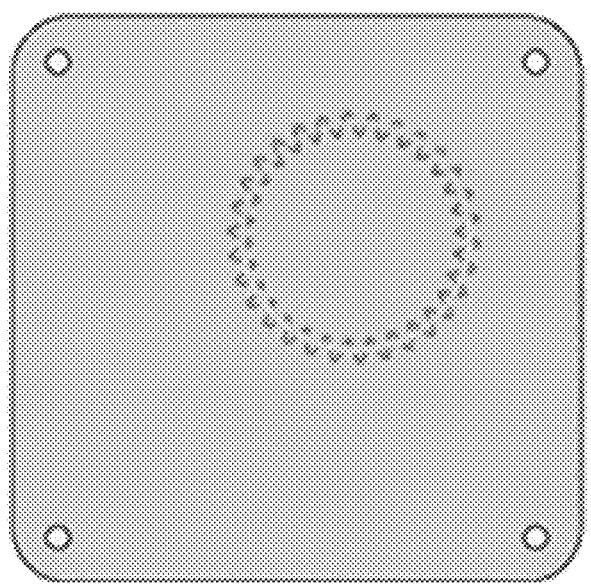
FIGS. 8a to 8e illustrate the expected signal responses for different alignments of the field of view with the optical axis of the laser beam.
Figure 8B:
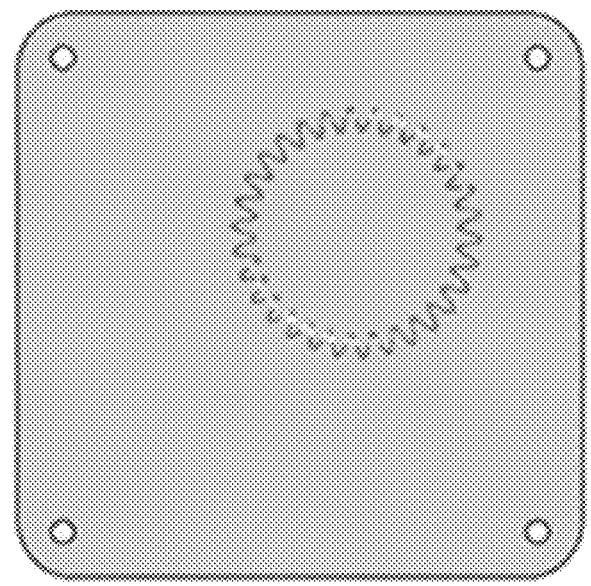
Figure 8C:
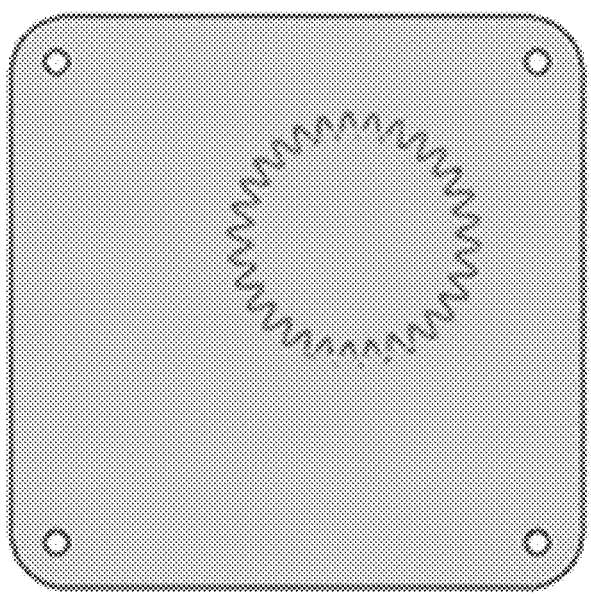
Figure 8D:
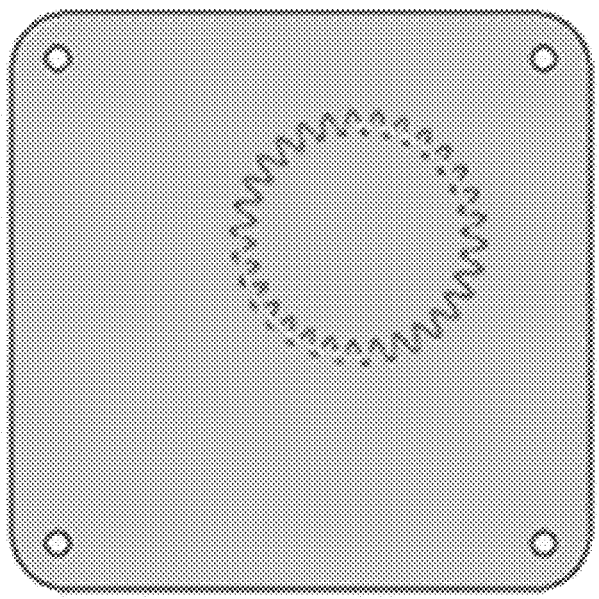
Figure 8E:
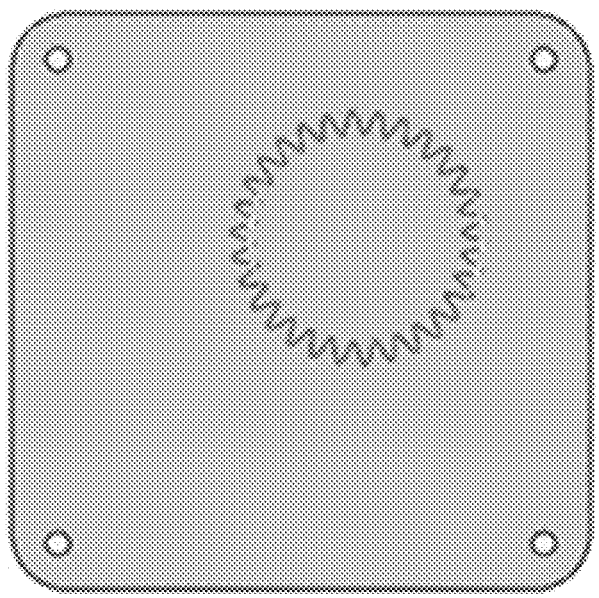

If the field of view 132 is aligned in both x- and y-direction with the corresponding laser beam, then the sensor signal will be a maximum at the intersection locations indicated by the dotted line (and as shown in FIG. 8a). If the field of view 132 is negative x-shifted the brightest signals would be as shown in FIG. 8b. If the field of view 132 is positive x-shifted the brightest signals would be as shown in FIG. 8c. If the field of view 132 is negative y-shifted the brightest signals would be as shown in FIG. 8d. If the field of view 132 is positive y-shifted the brightest signals would be as shown in FIG. 8e. Combinations of x- and y-shifts can also be determined from the pattern of maximum intensity signals generated by the melt-pool sensor 123. The adjustment to be made to the flexure 127 is determined from the signals from the melt-pool sensor 123 as the L2 path is scanned and the determined adjustment output on the display.

This process may be carried for each combination of optical module 106 to 106d and detector module 126.

Figure 9:
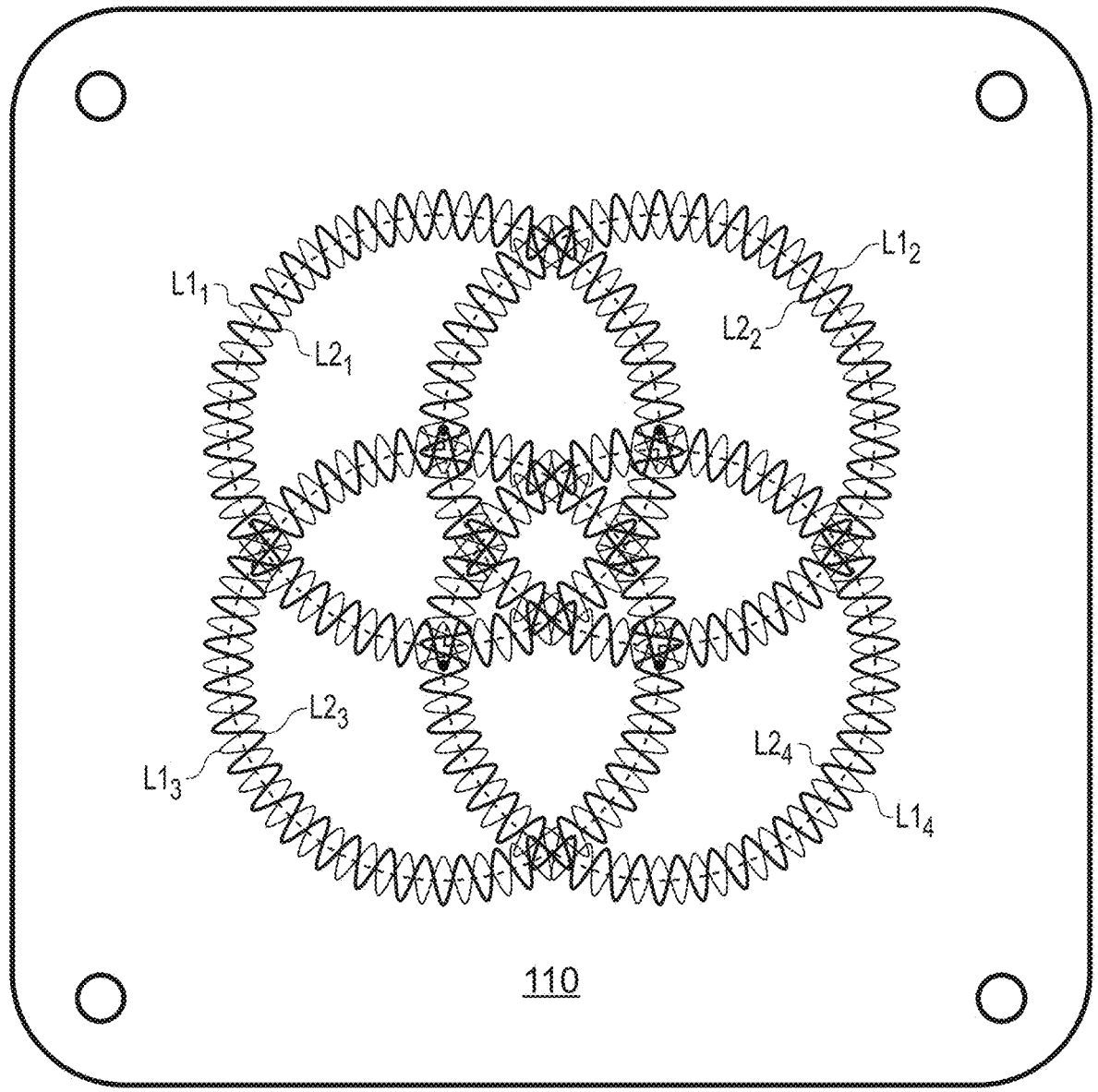
FIG. 9 illustrates scanning strategies for determining a misalignment of each detector module with its corresponding optical module.
Figure 10:
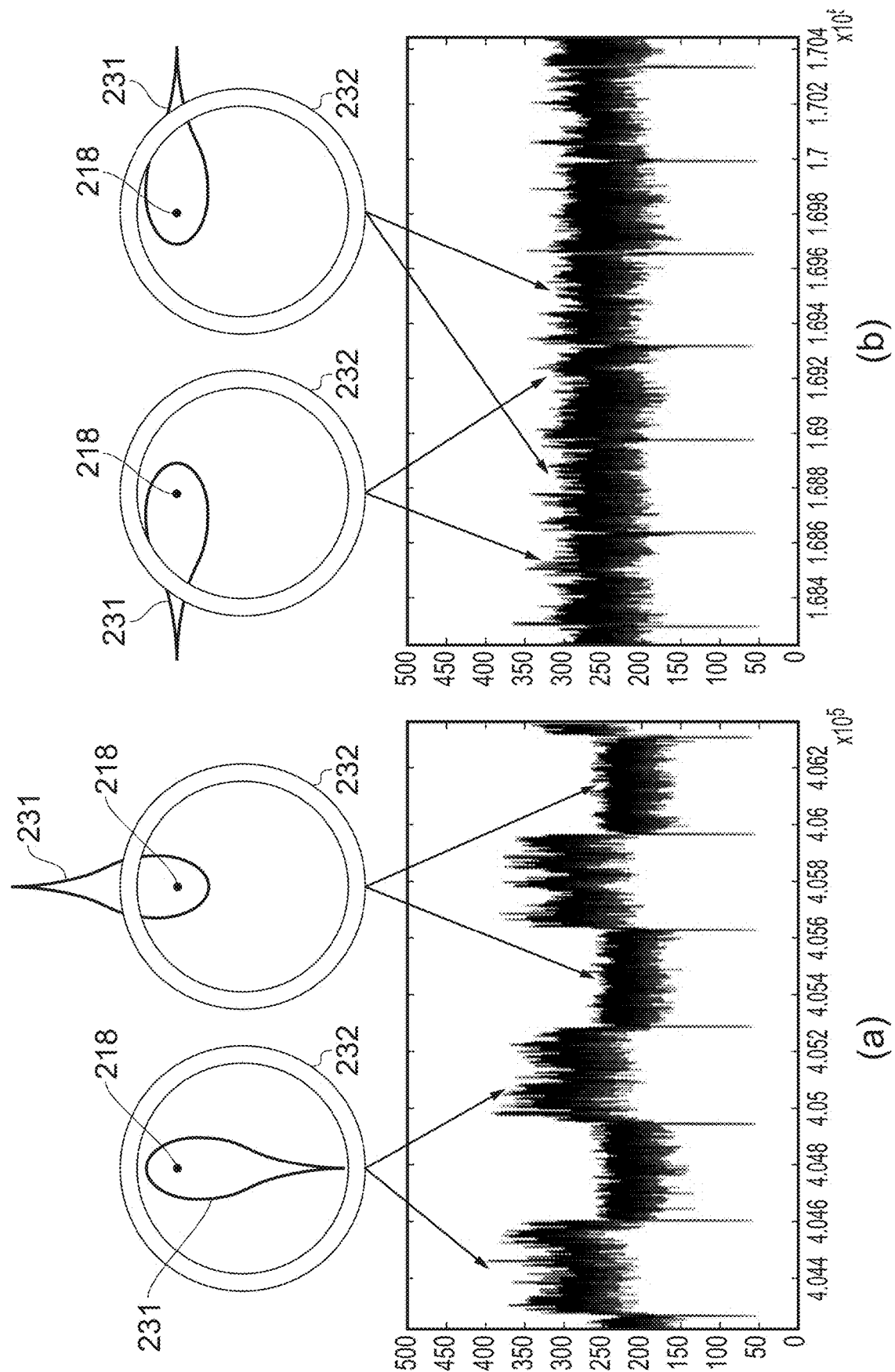
FIGS. 10a and 10b illustrate different signal responses for the on-axis optical sensor for different scan directions when the field of view of the on-axis optical sensor is offset from the optical axis of the optical train.

In one embodiment, the method as described with reference to FIGS. 7 and 8a to 8e is carried using each other laser beam as the laser beam for creating the melt pool. In FIG. 9, each optical module 106a to 106d is used steer a laser beam 118 along a corresponding scan path $L1_1$ to $L1_4$ to form melt pools. Each optical module 106a to 106d not used to steer the laser beam 118 is operated to steer the field of view of its corresponding on-axis melt pool sensor 123 along the corresponding scan path $L2_1$ to $L2_4$ such that the field of view intersects the melt pool as the field of view of moved along the scan path $L2_1$ to $L2_4$. In other words, when laser 118a is scanned along scan path $L1_1$ by optical module 106a, each optical module 106b, 106c, 106d steers the field of view 132 of its corresponding on-axis melt pool sensor 123 along scan path $L2_1$. When laser 118b is scanned along scan path $L1_2$ by optical module 106b, each optical module 106a, 106c, 106d steers the field of view 132 of its corresponding on-axis melt pool sensor 123 along scan path $L2_2$. When laser 118c is scanned along scan path $L1_3$ by optical module 106c, each optical module 106a, 106b, 106d steers the field of view 132 of its corresponding on-axis melt pool sensor 123 along scan path $L2_3$. When laser 118d is scanned along scan path $L1_4$ by optical module 106d, each optical module 106a, 106b, 106c steers the field of view 132 of its corresponding on-axis melt pool sensor 123 along scan path $L2_4$. The scan paths $L1_1$ to $L1_4$ are centred around a "quadrant home" for the optical module 106 that steers the laser beam 118 along the scan path $L1_1$ to $L1_4$ corresponding to a position at which the laser beam 118 is perpendicular to the working surface of the powder bed 104. In this way, variations in the melt pool and corresponding plume due to angular changes of the laser beams to the working surface of the powder bed when the laser beams are scanned along the paths $L1_1$ to $L1_4$ are minimised.

To synchronise the scanning of the fields of view 132 along scan path L2 with the scanning of the laser beam along scan path L1 for each pair of paths $L1_1$, $L2_1$; $L1_2$, $L2_2$; $L1_3$, $L2_3$; $L1_4$, $L2_4$, each scanning module 106a, 106b, 106c, 106d of the initially position the laser beam 118/field of view 132 at the quadrant home for the optical module that is scanning the laser beam 118 along the scan path L1. All the optical modules 106a, 106b, 106c, 106d are then synchronously set in motion to scan the path L1 or L2. In this way, synchronisation of the scanning along the paths L1 and L2 is maintained because the optical modules 106a, 106b, 106c, 106d scan the same distance from the common start position at the quadrant home. However, in another embodiment, the demand signals for the steering optics 141a, 141b may be generated based upon a predetermined timing sequence using a "deterministic" machine process, as described in WO2017/085469.

From the signals generated by the melt pool sensors 123 of the detector modules 126a to 126d, an adjustment to the alignment of the sensor 123 of the detector modules 126a to 126d relative to the optical axis of a corresponding optical module 106a to 106d can be determined. An output is displayed on a display indicating to an operator an adjustment that should be made to the flexure of the detector modules 126a to 126d.

Once the sensors 123 of the detector modules 126a to 126d have been aligned appropriately, the signals from the melt pool sensors 123 can be normalised. This is carried out by aligning all the fields of view 132 of the melt pool sensors 123a to 123d at the working surface and firing one of the laser beams 118a to 118d to form a melt pool and plume at the working surface within the fields of view 132. Each melt pool sensor 123a to 123d generates a signal for that event and these signals are compared. A scaling factor to be applied to the signals from the melt pool sensors 123a to 123d is determined for each melt pool sensor 123a to 123d such that the melt pool sensors 123a to 123d give the same output for the same event on the powder bed. In this way, the signals can be displayed and/or processed together without artefacts being present due to differential response of the melt pool sensors 123a to 123d.

The signals from the melt pool sensors 123a to 123d may be displayed in a two- or three-dimensional representation based on the measured positions of the galvanometers 124a, 124b when the signals are collected. For example, the two- or three-dimensional representation may be as described in US2013/0168902 A1 or WO2019/092415, which is incorporated herein by reference. The coordinate values to be associated with the sensor signals may be determined from the signals from the position sensors 125a, 125b that measure an angular position of the galvanometer 124a, 124b. To convert the signals from the position sensors 125a, 125b into cartesian coordinates corresponding to the working surface 110 a calibration routine is carried out. A markable plate, such as a mylar sheet, is placed at the working plane 110 and each optical module 106a to 106d is operated to steer the corresponding laser beam 118 to mark the plate at a plurality of positions across the plate. When forming each mark, signals from the position sensors 125a, 125b are recorded. An image is then captured of the marked plate and positions of the marks on the plate are correlated with outputs from the position sensors 125a, 125b.

A map is generated that maps the outputs from the position sensors 125a, 125b for each optical module 106a to 106d to cartesian coordinates at the working surface from the correlation for the marked positions and by interpolating between the marked positions for which data has been collected. Such a method may be carried out at the same time as calibrating the optical modules 106a to 106d for steering the laser beams 118a to 118d, for example using the method as described in WO94/15265. However, the method may also be carried out as a separate process to calibrating the optical modules 106a to 106d for steering the laser beams 118a to 118d.

During operation of the additive manufacturing apparatus, the mapping is used to determine from the signals from position sensors 125a, 125b coordinates to associate with the sensor values recorded by the melt pool sensors 123a to 123d. These coordinates can then be used to form a representation of the sensor values, as described above, and/or for further processing/analysis.

The above embodiment is applicable to an additive manufacturing apparatus comprising multiple optical trains for delivering multiple laser beams but cannot be used to align on-axis sensor(s) in additive manufacturing apparatus comprising a single optical train. A further embodiment of the invention for aligning an on-axis sensor with an optical axis of an optical train will now be described with reference to FIGS. 10 to 13. This embodiment is applicable, but not limited, to use in an additive manufacturing apparatus comprising a single optical train.

FIG. 10a illustrates a field of view 232 of an on-axis sensor which is not centred about a laser beam 218 delivered using the optical axis. For antiparallel scanning directions (in the drawing up the page on the left and down the page on the right) the plasma plume 231 generated by melting of the surface extends in different directions from the melt pool. Due to the misalignment of the field of view with the optical axis having a component at the working surface in the two scanning directions, a different proportion of the plasma plume 231 falls within the field of view 232 of the on-axis sensor for each antiparallel scanning directions. This results in differences in the sensor values generated by the on-axis sensor for the two antiparallel scanning directions as illustrated in FIG. 10a despite the common melt conditions generated when scanning in each of these directions.

FIG. 10b illustrates similar plots but this time for antiparallel scanning directions from left to right and vice-versa. Because the misalignment in the field of view with the optical axis at the working surface is orthogonal to these scanning directions, there is no or little difference in the sensor values generated by the on-axis sensor for each antiparallel scanning direction.

Figure 11:
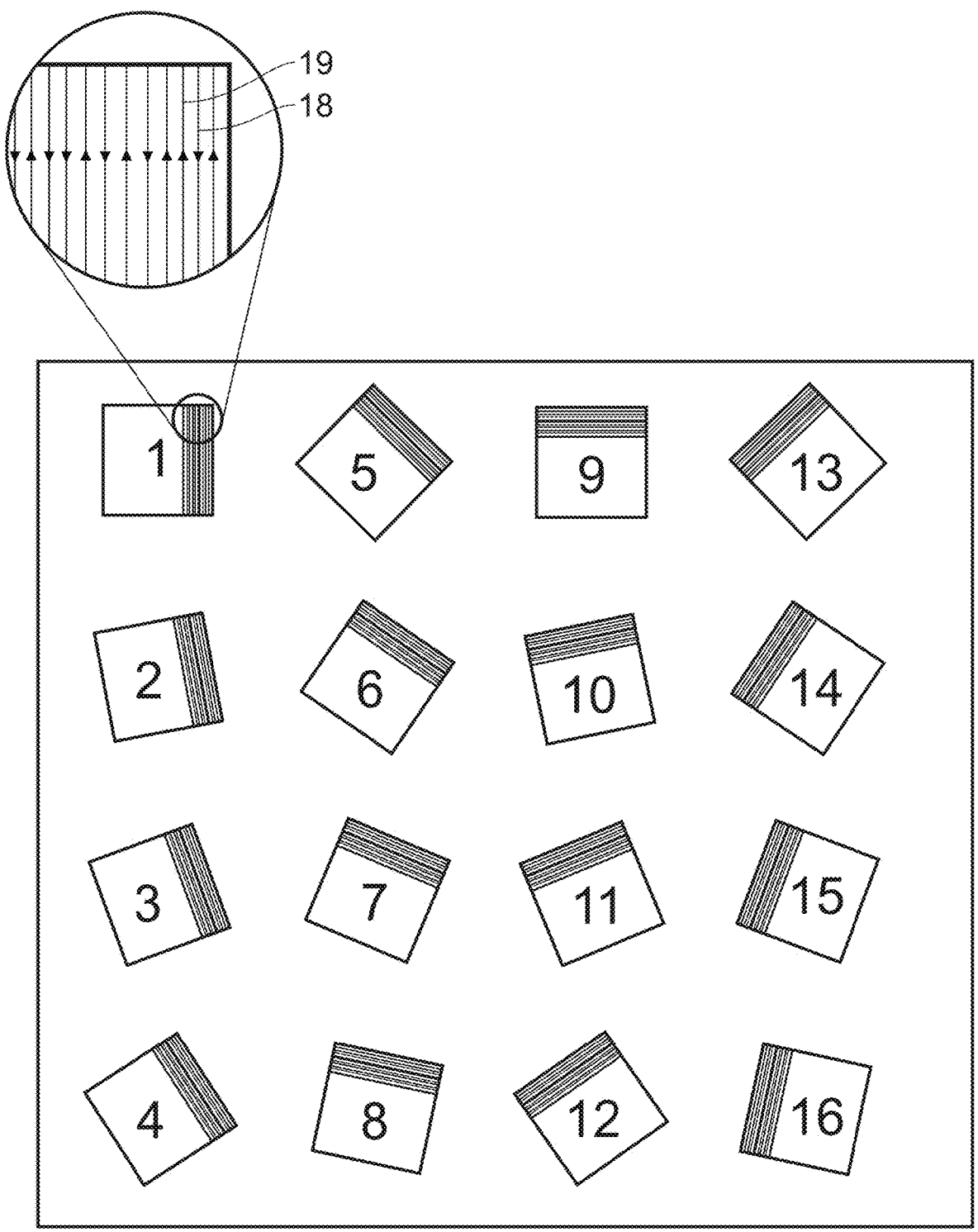
FIG. 11 illustrates a scanning strategy for determining a misalignment of an on-axis sensor with an optical axis of an optical module according to a further embodiment of the invention.

To determine a misalignment of the on-axis sensor with the optical axis of the optical train used to deliver the laser beam, a plurality of sets 1 to 16 of opposed scan paths are formed on an anodised aluminium sheet located on the build platform of the additive manufacturing apparatus. Each set 1 to 16 of opposed scan paths comprises a plurality of first scan paths 18 extending in a first direction in a plane of the working surface and a plurality of second scan paths 19 extending in a second direction antiparallel to the first direction. The scan paths 18, 19 of each set extend in a different direction to the scan paths of other sets. In this embodiment, sixteen sets of scan paths are formed to provide a scan path every 11.25 degrees (as shown in FIG. 11). It will be understood however that greater of fewer sets of opposed scan paths may be used. If only two sets of opposed scan paths are used, then it is advantageous for the scan paths of each set to extend in orthogonal directions. In this embodiment, scan paths of each set are of equal length and grouped into squares labelled 1 to 16 in FIG. 11 (for clarity, only some of the scan paths of each square are shown). These sets of opposed scan paths are formed when a gas flow used during an additive build is generated through the build chamber and typically in an inert atmosphere, such as an argon or hydrogen atmosphere, in the build chamber.

Figure 12B:
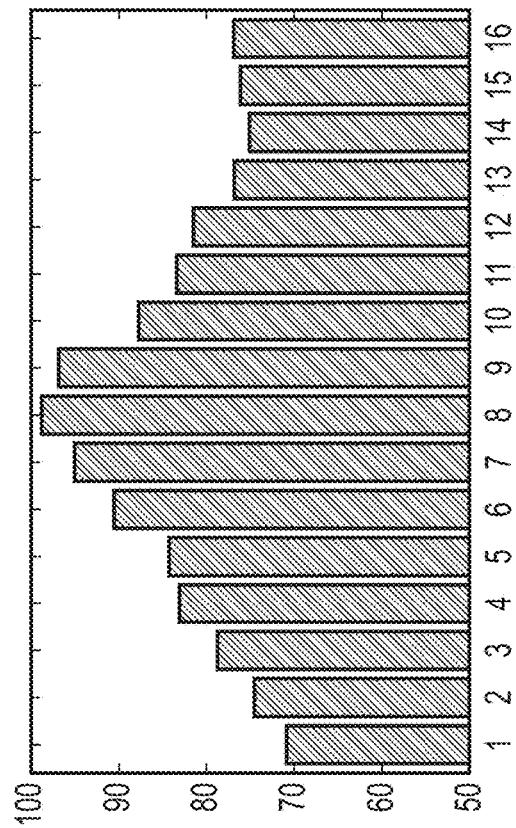
FIG. 12b is a polar plot of the RMS value for each scan path direction and FIG. 12c is a graph showing the difference between the RMS sensor values for each set of opposed scan paths.
Figure 12C:
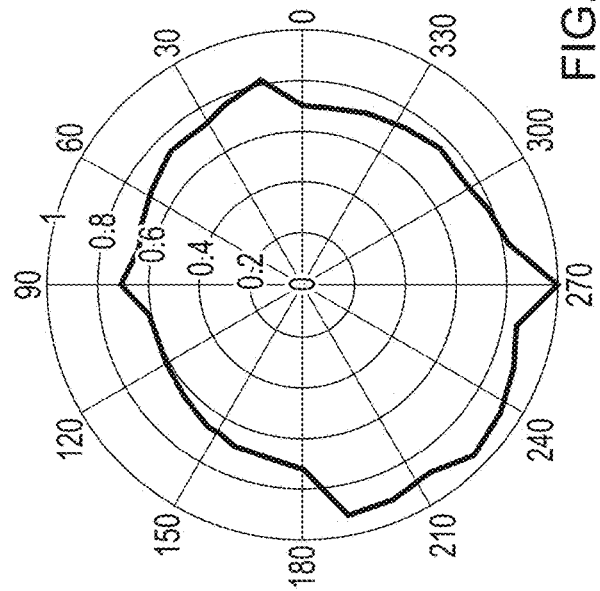
Figure 12A:
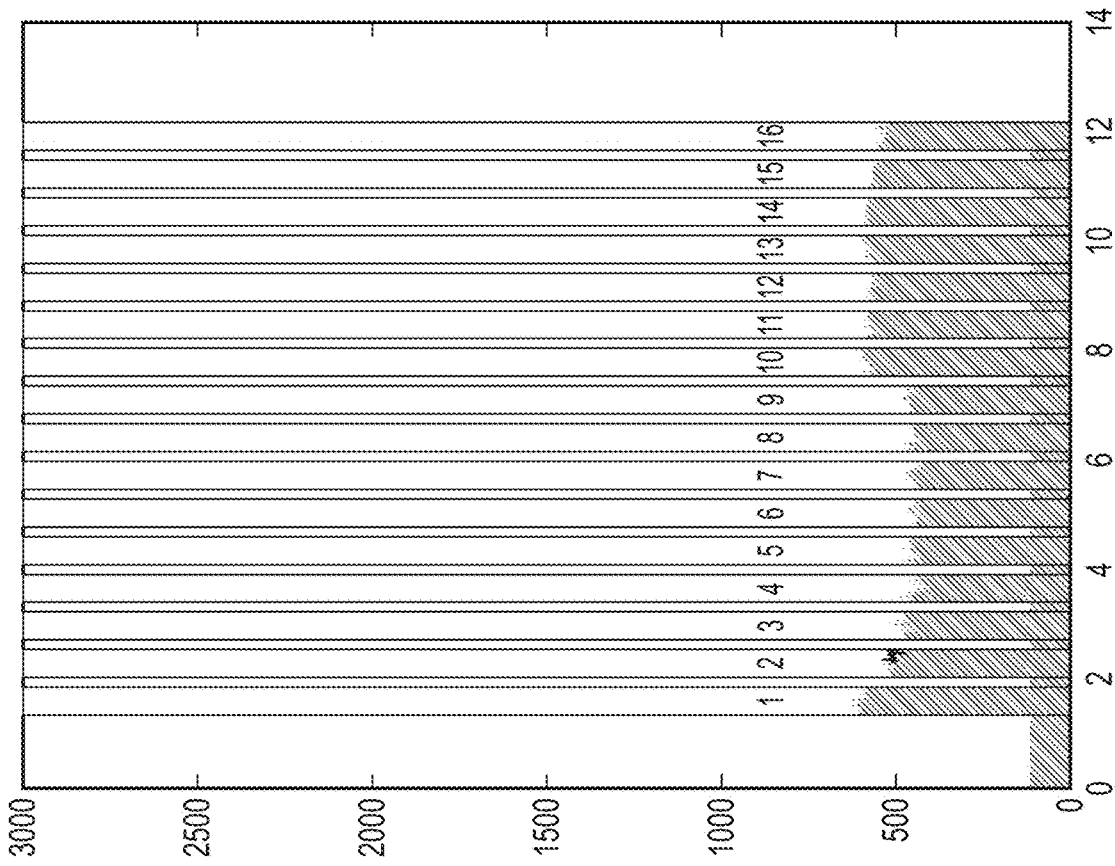
FIG. 12a is a plot showing on-axis sensor values for a misaligned on-axis sensor.

During formation of these scan paths, the on-axis sensor generates sensor values, which are recorded. FIG. 12a shows the sensor values generated for squares 1 to 16 when the on-axis sensor is misaligned with the optical axis of the optical train. The sensor values for each square includes sensor values for the two antiparallel scan directions of that set. FIG. 12b is a polar plot showing a measure derived from the sensor values, in this embodiment the RMS value, generated for each scan direction. As can be seen from FIG. 12b, there are significant differences in the intensity of the signal generated for the different scan path directions. It may be possible to determine from these RMS values the direction in which the on-axis sensor is misaligned with the optical axis of the optical train. In FIG. 12b, the scanning direction at 270 degrees has the highest intensity and the scanning directions between 90 and 150 have the lowest RMS values indicating that the misalignment is along this axis.

However, in this embodiment, the direction of misalignment is determined from a sign of the difference in the RMS value for each antiparallel scan path direction. FIG. 12c illustrates this difference for the data of FIGS. 12a and 12b. From these difference values it can be clearly seen that square 8 shows the smallest difference in the RMS value for the two antiparallel scan paths of this square, whereas square 1 shows the greatest difference. From these differences, a direction of adjustment is determined. In the example shown in FIGS. 12a to 12c, the adjustment is movement of the field of view in the 90 degrees direction as the antiparallel scan paths for this direction show the greatest difference and the RMS value for the scan paths in the 90 degrees direction is less than the RMS value for the scan path in the 270 degrees direction (i.e. the difference is negative for the 90 degrees direction). This direction is correlated to an adjustment of the flexure on the detector module. A magnitude of the adjustment that is required can be determined from the magnitude of the difference. A look-up table or function may be used to determine a magnitude in an adjustment of the flexure for a certain magnitude in the difference in the RMS values. Such a look-up table of function may be determined empirically.

FIGS. 13a to 13c illustrate the sensor values after a realignment of the on-axis sensor. As can be seen, there is now less variation in the differences in the on-axis sensor values.

In an alternative embodiment, the adjustment to be made to the position of the on-axis sensor relative to the optical axis of the optical train is determined from the magnitude in the difference for multiple sets of opposed scan paths. For example, a curve may be fitted to the differences to smooth out noise and/or fluctuations in the difference signal that are not caused by the misalignment of the on-axis sensor. In the case wherein only two sets of opposed scan paths are used, the scan paths of each set may be formed in orthogonal directions and the difference in the RMS sensor value for each set may give the adjustment to be made to a position of the on-axis sensor for orthogonal directions.

Furthermore, multiple groups of antiparallel scan paths having the same scan direction may be used. For example, these groups may be distributed throughout the working plane to reduce localised position effects on the RMS values. This could be achieved by repeating the pattern of the groups of antiparallel scan paths, such as that shown in FIG. 11, throughout the working plane.

It will be understood that modifications and alterations may be made to the above described embodiments without departing from the invention as defined herein. For example, different shaped scan paths may be used to determine misalignment of the melt pool sensors.

To determine a scaling factor for normalising the signals from the melt pool sensors, rather than determined a scaling factor from viewing the same melt pool, different melt pools may be viewed by one or more of the melt pool sensors, each melt pool formed with laser parameters set to achieve the same fluence conditions at the powder bed. This may be necessary if the scanning zone of each optical module 106*a* to 106*d* does not overlap with every other scanning zone. To determine a scaling factor for normalising the signals from the melt pool sensors, multiple melt pools viewed by multiple ones of the melt pool sensors may be formed at multiple positions in the working plane to take account a positional dependence in the differences between the signals from the melt pool sensors. For example, positional dependence may arise from the different angles that the laser beam makes to the working surface and/or the different viewing angles for different positions on the working surface.

The additive manufacturing apparatus may comprise position sensors, such as encoders, each for measuring a position of an on-axis melt pool sensor 123/detector module 126 relative to the optical axis of the corresponding optical train. The controller 140 may control the display to provide feedback on the position of the on-axis sensor 123/detector module 126 and/or control the motor based upon signals from the position sensors.

The invention claimed is:

1. A method of aligning an on-axis melt pool sensor in an additive manufacturing apparatus comprising scanning a first laser beam along a first scan path across a working surface using a first optical train to generate a melt pool along the first scan path and scanning a field of view of an on-axis sensor along a second scan path across the working surface using a second optical train for steering a second laser beam, wherein the first and second scan paths intersect and determining an adjustment to be made to an alignment of the field of view of the on-axis sensor with an optical axis of the second optical train from a variation in the signal generated by the on-axis sensor as the field of view is scanned along the second scan path.

2. A method according to claim 1, comprising adjusting an alignment of the field of view of the on-axis sensor to the optical axis of the second optical train.

3. A method according to claim 1, wherein the second scan path comprises a change in scanning direction across the working surface.

4. A method according to claim 1, wherein the second scan path comprises scanning in a first direction and scanning in a second direction orthogonal to the first direction.

5. A method according to claim 3, wherein the second scan path comprises an oscillating scan path.

6. A method according to claim 3, wherein the second scan path starts and finishes in the same place.

7. A method according to claim 1, wherein the first scan path is symmetrical with the second scan path.

8. A method according to claim 1, wherein the first and second scan paths are oscillating scan paths that are $\pi$ out of phase.

9. A method comprising, for each of a plurality of optical trains of an additive manufacturing apparatus, aligning a field of view of a corresponding on-axis melt pool sensor with the optical train using the method of claim 1.

10. A method according to claim 9, wherein the first laser beam used for determining an alignment of the field of view of the on axis melt pool sensor for two or more of the optical trains is the same laser beam.

11. An additive manufacturing apparatus for layer-by-layer manufacture of an object by laser melting comprising a first optical train comprising a first movable optical component for steering a first laser beam across a working surface, a second optical train comprising a second movable optical component for steering a second laser beam across the working surface, an on-axis melt-pool sensor for detecting radiation emitted by the melt pool and collected by the second movable optical component of the second optical train, and a controller arranged to control the first and second movable components of the first and second optical trains to scan the first laser beam along a first scan path across the working surface using the first optical train to generate a melt pool along the first scan path, to scan a field of view of the on-axis sensor along a second scan path across the working surface using the second optical train, wherein the first and second scan paths intersect, and determining an adjustment to be made to an alignment of the field of view of the on-axis sensor with an optical axis of the second optical train from a variation in the signal generated by the on-axis sensor as the field of view is scanned along the second scan path.

12. An additive manufacturing apparatus according to claim 11, comprising a third optical train comprising a third movable optical component for steering a third laser beam across the working surface, the controller arranged to scan the third laser beam along a third scan path across a working surface using the third optical train to generate a melt pool along the third scan path and scanning the field of view of the on-axis sensor along a fourth scan path across the working surface using the second one of the optical trains, wherein the third and fourth scan paths intersect, and determining an adjustment to be made to an alignment of the field of view of the on-axis sensor with the optical axis of the second optical train from a variation in the signal generated by the on-axis sensor as the field of view is scanned along the second and fourth scan paths.

13. An additive manufacturing apparatus according to claim 11, comprising an adjustment mechanism for adjusting a position of the field of view of the on-axis melt pool sensor relative to the optical axis of the second optical train.

14. A controller for an additive manufacturing apparatus for layer-by-layer manufacture of an object by laser melting, the additive manufacturing apparatus comprising a first optical train comprising a first movable optical component for steering a first laser beam across a working surface, a second optical train comprising a second movable optical component for steering a second laser beam across the working surface and an on-axis melt-pool sensor for detecting radiation emitted by the melt pool and collected by the second movable optical component of the second optical train, the controller configured to control the additive manufacturing apparatus to carry out the method according to claim 1.

15. A data carrier having instruction stored thereon, which, when executed by a controller for an additive manufacturing apparatus for layer-by-layer manufacture of an object by laser melting, the additive manufacturing apparatus comprising a first optical train comprising a first movable optical component for steering a first laser beam across a working surface, a second optical train comprising a second movable optical component for steering a second laser beam across the working surface and an on-axis melt-pool sensor for detecting radiation emitted by the melt pool and collected by the second movable optical component of the second optical train, cause the controller to control the additive manufacturing apparatus to carry out the method according to claim 1.

16. A method of aligning an on-axis melt pool sensor in an additive manufacturing apparatus comprising scanning a laser beam along a plurality of scan paths across a working surface using an optical train to generate melt pools along the plurality of scan paths, ones of the scan paths extending in different directions in a plane of the working surface, recording sensor values using an on-axis sensor which views the melt pools through the optical train and determining an adjustment to be made to an alignment of the field of view of the on-axis sensor with an optical axis of the optical train from a variation in the sensor values generated by the on-axis sensor with direction of the scan paths.

17. A method according to claim 16, wherein determining the adjustment comprises determining a measure for each scan path direction, the measure derived from a plurality of sensor values generated during scanning of the laser beam along that scan path direction.

18. A method according to claim 17, wherein the measure is a mean of the plurality of sensor values.

19. A method according to claim 17, wherein the plurality of scan paths comprises sets of opposed scan paths, each set comprising at least one first scan path extending in a first direction in a plane of the working surface and at least one second scan path extending in a second direction antiparallel to the first direction, the opposed scan paths between sets extending in transverse directions, wherein determining the adjustment comprises determining from at least one of the sets of scan paths, a difference in the measure for the at least one first scan path and for the at least one second scan path, and the adjustment is determined from the difference.

20. A method according to claim 19, comprising determining for each of the sets of scan paths, a difference in the measure for the at least one first scan path and for the at least one second scan path, and identifying a direction of the adjustment from the differences.

21. A method according to claim 20, wherein the adjustment is based upon the first and second directions of the set of opposed scan paths having the greatest difference between the measures determined for the at least one first scan path and the at least one second scan path.

22. A method according to claim 19, wherein a direction of the adjustment is determined from a sign of the difference.

23. A method according to claim 19, wherein each set comprises a plurality of first scan paths and a plurality of second scan paths.

24. An additive manufacturing apparatus for layer-by-layer manufacture of an object by laser melting comprising an optical train comprising a movable optical component for steering a laser beam across a working surface, an on-axis melt-pool sensor for detecting radiation emitted by the melt pool and collected by the movable optical component of the optical train, and a controller arranged to carry out the method of claim 16.

25. A controller for an additive manufacturing apparatus for layer-by-layer manufacture of an object by laser melting, the additive manufacturing apparatus comprising an optical train comprising a movable optical component for steering a laser beam across a working surface, and an on-axis melt-pool sensor for detecting radiation emitted by the melt pool and collected by the movable optical component of the optical train, the controller configured to control the additive manufacturing apparatus to carry out the method according to claim 16.

26. A data carrier having instruction stored thereon, which, when executed by a controller for an additive manufacturing apparatus for layer-by-layer manufacture of an object by laser melting, the additive manufacturing apparatus comprising an optical train comprising a movable optical component for steering a laser beam across a working surface, and an on-axis melt-pool sensor for detecting radiation emitted by the melt pool and collected by the movable optical component of the optical train, cause the controller to control the additive manufacturing apparatus to carry out the method according to claim 16.

* * * * *